US011993497B2

(12) United States Patent
Kraimer et al.

(10) Patent No.: US 11,993,497 B2
(45) Date of Patent: May 28, 2024

(54) ORDER PICKER MATERIALS HANDLING VEHICLE WITH IMPROVED DOWNWARD VISIBILITY WHEN DRIVING ELEVATED

(71) Applicant: Crown Equipment Corporation, New Bremen, OH (US)

(72) Inventors: James V. Kraimer, Munich (DE); Christoph Babel, Tuerkenfeld (DE)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 17/449,964

(22) Filed: Oct. 5, 2021

(65) Prior Publication Data

US 2022/0024739 A1 Jan. 27, 2022

Related U.S. Application Data

(60) Continuation of application No. 16/406,122, filed on May 8, 2019, now Pat. No. 11,167,968, which is a division of application No. 14/935,528, filed on Nov. 9, 2015, now Pat. No. 11,046,564.

(51) Int. Cl.
*B66F 9/075* (2006.01)
*B66F 9/07* (2006.01)
*B66F 9/08* (2006.01)

(52) U.S. Cl.
CPC .............. *B66F 9/0759* (2013.01); *B66F 9/07* (2013.01); *B66F 9/08* (2013.01)

(58) Field of Classification Search
CPC ............. B66F 9/0759; B66F 9/07; B66F 9/08
See application file for complete search history.

(56) References Cited

U.S. PATENT DOCUMENTS 1,576,793 A * 3/1926 Sadler ...................... B60R 1/105 359/841
1,841,176 A * 1/1932 Fromer ................... B60R 1/105 359/871
2,256,890 A * 9/1941 Brown ............... B62D 33/0625 296/102

(Continued)

FOREIGN PATENT DOCUMENTS

CN 1887683 A 1/2007
CN 101431915 A 5/2009

(Continued)

OTHER PUBLICATIONS

JP-2005082368-A—Machine translation (Year: 2005).*

(Continued)

*Primary Examiner* — Michael A Riegelman
(74) *Attorney, Agent, or Firm* — Stevens & Showalter LLP

(57) ABSTRACT

A materials handling vehicle including a power unit supported on wheels, and a mast assembly supported on the power unit. The mast assembly includes four or more telescoping sections defined by pairs of laterally spaced rails. An operator compartment is supported on the mast assembly for vertical movement relative to the mast assembly and includes a front wall defining a side of the operator compartment adjacent to the mast assembly. The laterally spaced rails have a height that is generally equal to the height of the front wall. A dash is located adjacent to the operator compartment.

18 Claims, 14 Drawing Sheets

(56) References Cited

U.S. PATENT DOCUMENTS

| | | | | | |
|---|---|---|---|---|---|
| 2,529,200 | A * | 11/1950 | Swanson | B66C 13/54 | 212/175 |
| 2,645,297 | A | 7/1953 | Wennberg et al. | | |
| 3,202,242 | A * | 8/1965 | Dolphin | B66F 9/06 | 414/666 |
| 3,235,034 | A * | 2/1966 | Quayle | B66F 9/08 | 187/229 |
| 3,414,086 | A * | 12/1968 | Ulinski | B66F 9/08 | 187/230 |
| 3,643,899 | A * | 2/1972 | Firestone | B64C 1/28 | 244/129.1 |
| 3,756,330 | A * | 9/1973 | Russell, Jr. | E21B 7/005 | 175/324 |
| 3,844,382 | A * | 10/1974 | Mecklenburg | B60L 50/60 | 187/222 |
| 3,858,688 | A * | 1/1975 | Galloway | B66F 11/04 | 187/244 |
| 3,932,028 | A * | 1/1976 | Klingler | A01B 69/001 | 172/430 |
| 3,946,885 | A * | 3/1976 | Menkel, Jr. | B65F 3/04 | 414/408 |
| 4,015,686 | A * | 4/1977 | Bushnell, Jr. | B66F 11/04 | 187/244 |
| 4,176,732 | A | 12/1979 | Nordskog | | |
| 4,191,276 | A * | 3/1980 | Farmer | B66F 9/08 | 187/229 |
| 4,261,438 | A * | 4/1981 | Olson | B66F 9/08 | 187/229 |
| 4,291,946 | A * | 9/1981 | van der Lely | B60R 1/082 | 359/857 |
| 4,309,142 | A * | 1/1982 | Shumaker | E02F 9/26 | 37/444 |
| 4,392,669 | A * | 7/1983 | Martin, Jr. | B60K 1/04 | 280/775 |
| 4,432,438 | A * | 2/1984 | Robinson, Jr. | B66F 9/08 | 187/234 |
| 4,484,663 | A * | 11/1984 | Wyse | E06C 7/16 | 187/230 |
| 4,732,462 | A * | 3/1988 | Bel | B66C 13/54 | 359/872 |
| 4,919,233 | A * | 4/1990 | Larsen | B66F 9/07545 | 414/914 |
| 5,036,942 | A | 8/1991 | Loewen | | |
| 5,201,629 | A | 4/1993 | Simpson et al. | | |
| 5,203,425 | A * | 4/1993 | Wehmeyer | B66F 11/04 | 182/148 |
| 5,273,132 | A * | 12/1993 | Sasaki | B66F 11/04 | 187/244 |
| 5,275,255 | A * | 1/1994 | Huntley | B66F 9/10 | 180/326 |
| 5,520,258 | A * | 5/1996 | Kemshall | B60L 1/003 | 180/326 |
| 5,657,834 | A * | 8/1997 | Plaugher | B66F 9/08 | 414/630 |
| 5,666,227 | A * | 9/1997 | Ben-Ghiath | B60R 1/10 | 359/857 |
| 5,755,306 | A * | 5/1998 | Kraemer | B66F 11/04 | 182/148 |
| 5,803,204 | A * | 9/1998 | White | B66F 11/04 | 182/148 |
| 5,850,892 | A * | 12/1998 | Citron | B66F 11/04 | 187/230 |
| 5,875,869 | A * | 3/1999 | Busuttil | B66F 11/04 | 280/43.23 |
| 5,890,559 | A | 4/1999 | Busuttil et al. | | |
| 5,890,562 | A * | 4/1999 | Bartels | B66F 9/20 | 180/326 |
| 5,984,050 | A * | 11/1999 | Ronald | B66F 9/08 | 187/234 |
| 5,992,572 | A * | 11/1999 | Gilliland | B66F 9/06 | 182/148 |
| 6,000,502 | A * | 12/1999 | Leasor | B66F 9/072 | 180/401 |
| 6,070,690 | A | 6/2000 | Eavenson et al. | | |
| 6,095,263 | A * | 8/2000 | Saunders | E21B 7/026 | 175/219 |
| 6,095,286 | A | 8/2000 | Citron et al. | | |
| 6,104,538 | A | 8/2000 | Ben-Ghiath | | |
| 6,125,971 | A * | 10/2000 | Niebuhr | B66F 9/08 | 187/222 |
| 6,174,124 | B1 * | 1/2001 | Haverfield | B66F 11/04 | 182/148 |
| 6,182,797 | B1 * | 2/2001 | Tebbe | B66F 9/07531 | 187/222 |
| 6,189,636 | B1 * | 2/2001 | Kikukawa | H01M 50/271 | 180/68.5 |
| 6,241,047 | B1 * | 6/2001 | Gilliland | B66F 11/04 | 187/222 |
| 6,378,652 | B1 * | 4/2002 | Albert | B66F 11/04 | 182/148 |
| 2,024,000 | A1 | 6/2002 | Kelley et al. | | |
| 6,405,880 | B1 * | 6/2002 | Webb | A47F 1/12 | 211/187 |
| 6,471,004 | B2 * | 10/2002 | Stringer | E04G 5/14 | 182/148 |
| 6,648,581 | B2 * | 11/2003 | Gibson | B65G 1/1375 | 187/222 |
| 6,793,247 | B2 | 9/2004 | Swetish | | |
| 6,871,721 | B2 * | 3/2005 | Smiley | E02F 9/2004 | 296/153 |
| 6,948,740 | B2 | 9/2005 | Chernoff et al. | | |
| 6,971,194 | B2 | 12/2005 | Mcclelland et al. | | |
| 7,040,427 | B2 | 5/2006 | Toomey | | |
| 7,059,680 | B2 | 6/2006 | Billger et al. | | |
| 7,278,678 | B2 | 10/2007 | Martin | | |
| 7,306,280 | B1 * | 12/2007 | Kraimer | B66F 9/07545 | 296/107.03 |
| 7,314,116 | B2 | 1/2008 | David et al. | | |
| 7,360,628 | B2 | 4/2008 | Charvet | | |
| 7,472,945 | B2 * | 1/2009 | Miura | B66F 9/07545 | 296/213 |
| 7,520,567 | B2 | 4/2009 | Billger et al. | | |
| 7,629,996 | B2 | 12/2009 | Rademacher et al. | | |
| 7,635,045 | B2 | 12/2009 | Shearer et al. | | |
| 7,658,259 | B2 | 2/2010 | Smiley et al. | | |
| 7,681,686 | B1 | 3/2010 | Klas et al. | | |
| 7,712,571 | B2 | 5/2010 | Proud et al. | | |
| 7,784,581 | B1 | 8/2010 | Klas et al. | | |
| D625,074 | S * | 10/2010 | Knie | D34/34 | |
| 7,950,492 | B2 | 5/2011 | Jorgensen | | |
| 7,963,350 | B1 * | 6/2011 | Thielman | F41H 7/02 | 180/7.1 |
| 8,037,952 | B2 | 10/2011 | Bock | | |
| 8,069,927 | B2 | 12/2011 | Bachstein et al. | | |
| 8,212,770 | B2 | 7/2012 | Obourn et al. | | |
| 8,235,161 | B2 | 8/2012 | Passeri et al. | | |
| 8,261,629 | B2 | 9/2012 | Barnabo et al. | | |
| 8,276,476 | B2 | 10/2012 | Diccion | | |
| 8,714,049 | B2 | 5/2014 | Ast et al. | | |
| 8,726,757 | B2 | 5/2014 | Barroso | | |
| 8,789,654 | B2 * | 7/2014 | Campbell | B66F 11/04 | 182/141 |
| 8,944,744 | B2 | 2/2015 | Kleeberger et al. | | |
| 8,985,263 | B2 | 3/2015 | Peterson et al. | | |
| 9,235,553 | B2 | 1/2016 | Fitch et al. | | |
| 9,342,091 | B2 | 5/2016 | Wuisan et al. | | |
| 9,382,105 | B2 | 7/2016 | Hoock | | |
| 9,434,585 | B2 | 9/2016 | Gilbride et al. | | |
| 9,828,018 | B2 | 11/2017 | Mihara et al. | | |
| 9,840,826 | B2 | 12/2017 | Huber et al. | | |
| 9,932,062 | B2 | 4/2018 | Sap | | |
| 10,077,543 | B2 | 9/2018 | Heinzmann et al. | | |
| 10,093,365 | B2 | 10/2018 | Iwata | | |
| 10,198,086 | B2 | 2/2019 | Parazynski et al. | | |
| 10,301,156 | B2 | 5/2019 | Kraimer et al. | | |
| 10,544,022 | B2 | 1/2020 | Porter et al. | | |
| 10,606,303 | B2 | 3/2020 | Weigand | | |
| 10,800,441 | B2 | 10/2020 | Board et al. | | |
| 10,815,643 | B2 | 10/2020 | Wuisan et al. | | |

(56) References Cited

U.S. PATENT DOCUMENTS

| | | | | |
|---|---|---|---|---|
| 10,850,761 | B2 | 12/2020 | Heusinger | |
| 11,046,564 | B2 | 6/2021 | Kraimer et al. | |
| 2002/0100644 | A1 * | 8/2002 | Stringer | B66B 9/16 187/230 |
| 2004/0245038 | A1 * | 12/2004 | Smiley | E02F 9/2004 180/315 |
| 2005/0067361 | A1 * | 3/2005 | Waymire | B66F 11/04 211/70.6 |
| 2006/0037790 | A1 | 2/2006 | Haack et al. | |
| 2006/0070816 | A1 * | 4/2006 | Schroder | B66F 9/08 187/222 |
| 2006/0272874 | A1 * | 12/2006 | Kraimer | B66F 9/07531 180/68.5 |
| 2007/0074923 | A1 | 4/2007 | Billger et al. | |
| 2007/0182121 | A1 * | 8/2007 | Kraimer | B66F 9/07545 280/166 |
| 2010/0072801 | A1 | 3/2010 | Adelsperger et al. | |
| 2010/0089703 | A1 * | 4/2010 | Gallagher | B62D 51/04 187/231 |
| 2010/0181147 | A1 * | 7/2010 | Simpson | B66F 9/18 187/230 |
| 2010/0181148 | A1 | 7/2010 | Simpson | |
| 2011/0120807 | A1 | 5/2011 | Persson et al. | |
| 2011/0180349 | A1 * | 7/2011 | Beji | B66F 11/04 182/148 |
| 2011/0243699 | A1 * | 10/2011 | Kleeberger | B66F 9/148 414/667 |
| 2011/0271782 | A1 | 11/2011 | Perk et al. | |
| 2013/0153336 | A1 * | 6/2013 | Wu | B66F 11/04 182/113 |
| 2013/0183127 | A1 | 7/2013 | Dammeyer | |
| 2013/0206508 | A1 * | 8/2013 | Rushlow | E04G 1/18 206/557 |
| 2015/0253801 | A1 | 9/2015 | Wuisan et al. | |
| 2017/0129753 | A1 * | 5/2017 | Kraimer | B66F 9/08 |
| 2017/0225627 | A1 * | 8/2017 | Molnar | B60K 37/06 |
| 2018/0141796 | A1 * | 5/2018 | Kraimer | B66F 9/08 |
| 2018/0217626 | A1 | 8/2018 | Bartel et al. | |
| 2019/0071113 | A1 | 3/2019 | Board et al. | |
| 2019/0263646 | A1 | 8/2019 | Kraimer et al. | |
| 2019/0276066 | A1 | 9/2019 | Heusinger | |
| 2019/0359244 | A1 | 11/2019 | Yoshioka et al. | |
| 2020/0001710 | A1 | 1/2020 | Taira et al. | |
| 2020/0284272 | A1 | 9/2020 | Abraham | |
| 2020/0291770 | A1 | 9/2020 | Jostes | |
| 2021/0380381 | A1 * | 12/2021 | Hinders | B66F 9/07545 |
| 2021/0380382 | A1 * | 12/2021 | Otto | B66F 9/07545 |

FOREIGN PATENT DOCUMENTS

| | | | | |
|---|---|---|---|---|
| DE | 19936192 | A1 | | 8/2000 |
| DE | 29824820 | U1 | | 11/2002 |
| DE | 10202508 | A1 | | 7/2003 |
| DE | 20301165 | U1 | | 7/2004 |
| DE | 102005049006 | A1 | | 4/2007 |
| DE | 102009051785 | A1 | | 5/2011 |
| DE | 102013105299 | A1 | | 5/2011 |
| DE | 102012020312 | A1 | | 4/2014 |
| EP | 0555025 | B1 | | 5/1997 |
| EP | 0931759 | A1 | | 7/1999 |
| EP | 0995663 | A2 | | 4/2000 |
| EP | 1012104 | A1 | | 6/2000 |
| EP | 1281598 | A2 | | 2/2003 |
| EP | 1314634 | A2 | | 5/2003 |
| EP | 1505033 | A1 | | 2/2005 |
| EP | 1686089 | A1 | | 8/2006 |
| EP | 1731477 | A2 | | 12/2006 |
| EP | 1818752 | A1 | | 8/2007 |
| EP | 1828045 | A2 | | 9/2007 |
| EP | 1999058 | A2 | | 12/2008 |
| EP | 2123597 | A1 | | 11/2009 |
| EP | 2342116 | A1 | | 7/2011 |
| EP | 2347989 | A1 | | 7/2011 |
| EP | 2406169 | A1 | | 1/2012 |
| EP | 2412552 | A2 | | 2/2012 |
| EP | 2412661 | A1 | | 2/2012 |
| EP | 2439167 | A1 | | 4/2012 |
| EP | 2518009 | A1 | | 10/2012 |
| EP | 2567878 | A1 | | 3/2013 |
| EP | 2641862 | A1 | | 9/2013 |
| EP | 2805911 | A1 | | 11/2014 |
| EP | 3083368 | A1 | | 10/2016 |
| EP | 3246225 | A1 | | 11/2017 |
| EP | 3486209 | A1 | | 5/2019 |
| EP | 3502043 | A1 | | 6/2019 |
| EP | 3505485 | A1 | | 7/2019 |
| GB | 2381853 | B | | 8/2005 |
| JP | H11246192 | A | | 9/1999 |
| JP | 2003146595 | A | | 5/2003 |
| JP | 2005082368 | A | * | 3/2005 |
| JP | 2005082368 | A | | 3/2005 |
| JP | 5545686 | B1 | | 5/2014 |
| KR | 20130064580 | A | | 6/2013 |
| KR | 20140129507 | A | | 11/2014 |
| WO | 9911558 | A1 | | 3/1999 |
| WO | 2013115705 | A1 | | 8/2013 |
| WO | 2013136036 | A1 | | 9/2013 |
| WO | 2014202512 | A1 | | 12/2014 |
| WO | 2017083029 | A1 | | 5/2017 |

OTHER PUBLICATIONS

Office Action dated Jul. 26, 2022; Canadian Application No. 3,002,533; Canadian Intellectual Property Office; Gatineau, Quebec.

International Search Report and Written Opinion of the International Searching Authority dated Mar. 1, 2022; International Application No. PCT/US2021/035578; European Patent Office; Rijswijk, Netherlands.

Riegelman, Michael A.; Restriction Requirement; U.S. Appl. No. 14/935,528; dated Sep. 14, 2017; United States Patent and Trademark Office; Alexandria, VA.

Riegelman, Michael A.; Restriction Requirement; U.S. Appl. No. 14/935,528; dated Aug. 16, 2018; United States Patent and Trademark Office; Alexandria, VA.

Riegelman, Michael A.; Corrected Notice of Allowability dated May 28, 2021; U.S. Appl. No. 14/935,528; United States Patent and Trademark Office; Alexandria, VA.

Riegelman, Michael A.; Advisory Action; U.S. Appl. No. 15/874,981; dated Nov. 20, 2018; United States Patent and Trademark Office; Alexandria, VA.

Riegelman, Michael A.; Advisory Action; U.S. Appl. No. 15/874,981; dated Jan. 4, 2019; United States Patent and Trademark Office; Alexandria, VA.

Riegelman, Michael A.; Restriction Requirement; U.S. Appl. No. 16/406,122; dated Jul. 30, 2019; United States Patent and Trademark Office; Alexandria, VA.

Riegelman, Michael A.; Advisory Action; U.S. Appl. No. 16/406,122; dated Mar. 20, 2020; United States Patent and Trademark Office; Alexandria, VA.

Riegelman, Michael A.; Corrected Notice of Allowability; U.S. Appl. No. 16/406,122; dated Oct. 14, 2021; United States Patent and Trademark Office; Alexandria, VA.

Office Action dated Mar. 31, 2022; Mexican Application No. MX/a/2018/005287; Mexican Institute of Industrial Property; Mexico City, Mexico.

Order Picker Truck V15 Series 5215 product brochure; Linde Material Handling; published Feb. 1, 2019; retrieved from https://www.kion-na.com/product_view/product_1_82.html.

EKS 310s-412s Operating Instructions; Jungheinrich AG; pp. 193-194; published Mar. 2019; Hamburg, Germany.

Medium and high level order picking; Unicarriers; published Jan. 2018; downloaded from https://www.unicarrierseurope.com/sites/unicarrierseurope.com/files/product_brochure/19763_hlop_brochure_en_02_low.pdf.

BT Optio H-series Product guide; Toyota Material Handling International; published Dec. 2011; pp. 21-22, 50-51; Mjolby, Sweden.

(56) References Cited

OTHER PUBLICATIONS

Image from Unicarrier lift truck; PEGAMO Group website; retrieved from https://www.pegamo.es/es/carretillas-elevadoras/productos/carretillas-elevadoras/unicarriers/recogepedidos/epm-eph/ on Aug. 19, 2021.
Step 3 Orderpickers BT Optio H Series; Product Planning and Support; Toyota Material Handling International; pp. 1, 2, 26-28; Jul. 7, 2014.
John Hinders et al.; Related U.S. Appl. No. 17/303,603 entitled "Operator Control System For a Materials Handling Vehicle"; filed Jun. 3, 2021.
Matthew Jacob Otto and Adam M. Ruppert; Related U.S. Appl. No. 17/303,607 entitled "Vertical Viewing Windows in a Materials Handling Vehicle"; filed Jun. 3, 2021.
Big Lift LLC; "The J1 Joey—Task Support Vehicle"; brochure available at least on or before Nov. 7, 2014.
Photographs of Big Joe (J1 Joey); photographs available at least on or before Dec. 11, 2014.
Brochure of J1 Joey—Task Support Vehicle; brochure available at least on or before Dec. 2, 2014.
Advertisement for J2 Joey; "Radical new lift truck design to be introduced at ProMat 201515253"; advertisement available at least on or before Dec. 2, 2014.
JLG Toucan Duo (1 of 3); photographs available at least on or before Dec. 18, 2014.
JLG Toucan Duo (2 of 3); photographs available at least on or before Dec. 18, 2014.
JLG Toucan Duo (3 of 3); photographs available at least on or before Dec. 18, 2014.
Jungheinrich EKS110 and Toyota OSE; photograph available at least on or before Nov. 7, 2014.
Photograph; Jungheinrich Linde Still Toyota-BT; photograph available at least on or before Nov. 25, 2014.
Photograph; LP—BT 3; photograph available at least on or before Oct. 20, 2015.
Photograph; Schimmel 040; photograph available at least on or before Oct. 20, 2015.
Linde AG; "Medium-Level Order Picker 1000 kg"; brochure available at least on or before Oct. 20, 2014.
Riegelman, Michael A.; Office Action; U.S. Appl. No. 14/935,528; dated Nov. 30, 2017; United States Patent and Trademark Office; Alexandria, VA.
Riegelman, Michael A.; Final Office Action; U.S. Appl. No. 14/935,528; dated Apr. 6, 2018; United States Patent and Trademark Office; Alexandria, VA.
Riegelman, Michael A.; Office Action; U.S. Appl. No. 14/935,528; dated Oct. 22, 2018; United States Patent and Trademark Office; Alexandria, VA.
Reigelman, Michael A.; Examiner's Answer; U.S. Appl. No. 14/935,528; dated May 6, 2019; United States Patent and Trademark Office; Alexandria, Va.
Riegelman, Michael A.; Decision on Appeal; U.S. Appl. No. 14/935,528, filed Nov. 3, 2020; United States Patent and Trademark Office; Alexandria, VA.
Riegelman, Michael A.; Notice of Allowance dated Feb. 24, 2021; U.S. Appl. No. 14/935,528; United States Patent and Trademark Office; Alexandria, VA.
Riegelman, Michael A.; Notice of Allowance dated Jan. 15, 2021; U.S. Appl. No. 14/935,528; United States Patent and Trademark Office; Alexandria, Virginia.
Riegelman, Michael A.; Office Action; U.S. Appl. No. 15/874,981; dated Apr. 6, 2018; United States Patent and Trademark Office; Alexandria, VA.
Riegelman, Michael A.; Final Office Action; U.S. Appl. No. 15/874,981; dated Oct. 12, 2018; United States Patent and Trademark Office; Alexandria, VA.
Riegelman, Michael A.; Notice of Allowance; U.S. Appl. No. 15/874,981; dated Jan. 31, 2019; United States Patent and Trademark Office; Alexandria, VA.
Riegelman, Michael A.; Office Action; U.S. Appl. No. 16/406,122; dated Oct. 10, 2019; United States Patent and Trademark Office; Alexandria, VA.
Riegelman, Michael A.; Office Action; U.S. Appl. No. 16/406,122; dated Jan. 30, 2020; United States Patent and Trademark Office; Alexandria, VA.
Riegelman, Michael A.; Office Action; U.S. Appl. No. 16/406,122; dated May 1, 2020; United States Patent and Trademark Office; Alexandria, VA.
Riegelman, Michael A.; Office Action; U.S. Appl. No. 16/406,122; dated Aug. 24, 2020; United States Patent and Trademark Office; Alexandria, VA.
Riegelman, Michael A.; Advisory Action; U.S. Appl. No. 16/406,122; dated Oct. 29, 2020; United States Patent and Trademark Office; Alexandria, VA.
Riegelman, Michael A.; Notice of Allowance and Fees Due; U.S. Appl. No. 16/406,122; dated Mar. 25, 2021; United States Patent and Trademark Office; Alexandria, VA.
Riegelman, Michael A.; Notice of Allowance and Fees Due; U.S. Appl. No. 16/406,122; dated Jul. 12, 2021; United States Patent and Trademark Office; Alexandria, VA.
Renato Serodio; Invitation to Pay Additional Fees; International Application No. PCT/US2016/055410; Feb. 13, 2017; European Patent Office; Riswijk, Netherlands.
Renato Serodio; International Search Report and Written Opinion; International Application No. PCT/US2016/055410; dated Mar. 29, 2017; European Patent Office; Riswijk, Netherlands.
Annik Appelen; Invitation to Pay Additional Fees; International Application No. PCT/US2021/035578; Oct. 5, 2021; European Patent Office; Riswijk, Netherlands.
Ronish Chaudhary; Examination Report; Australian Application No. 2016353843; dated Apr. 2, 2021; Australian Patent Office.
Search Report; Chinese Patent Application No. 201680062690; dated Jan. 25, 2019; China National Intellectual Property Administration; Beijing, China.
Office Action; Chinese Patent Application No. 201680062690; dated Feb. 2, 2019; China National Intellectual Property Administration; Beijing, China.
Office Action; Chinese Patent Application No. 201680062690; dated Aug. 22, 2019; China National Intellectual Property Administration; Beijing, China.
Search Report; Chinese Patent Application No. 201680062690; dated Jan. 3, 2020; China National Intellectual Property Administration; Beijing, China.
Office Action; Chinese Patent Application No. 201680062690; dated Jan. 20, 2020; China National Intellectual Property Administration; Beijing, China.
Supplementary Search; Chinese Patent Application No. 201680062690; dated Jun. 30, 2020; China National Intellectual Property Administration; Beijing, China.
Renato Serodio; Extended European Search Report; European Application No. 19/160,901; dated Jul. 8, 2019; European Patent Office; Munich, Germany.
Omiros Verheul; International Search Report and Written Opinion; International Application No. PCT/US2021/035589; dated Oct. 4, 2021; European Patent Office; Rijswijk, Netherlands.
International Preliminary Report on Patentability dated Dec. 6, 2022; International Application No. PCT/US2021/035589; The International Bureau of WIPO; Geneva, Switzerland.
International Preliminary Report on Patentability dated Dec. 6, 2022; International Application No. PCT/US2021/035578; The International Bureau of WIPO; Geneva, Switzerland.
Henrot, Benoist; Office Action dated Apr. 11, 2023; Canadian Application No. 3002533; CIPO; Quebec, Canada.
Serodio, Renato; Examiners Report dated Mar. 22, 2023; European Application No. 19160901.5; European Patent Office; Rijswijk, Netherlands.
Chang, Hoon; Notice of Preliminary Rejection dated May 19, 2023; Korean Application No. 10-2018-7016102; Korean Intellectual Property Office; Daejeon, Korea.
Chaudhary, Ronish; Examiners Report No. 1 dated May 25, 2023; Australian Application No. 20220132; IP Australia.

(56) References Cited

OTHER PUBLICATIONS

Berry Jr., Willie Wendell; Non-Final Office Action date Sep. 28, 2023; U.S. Appl. No. 17/303,607; United States Patent and Trademark Office; Alexandria, Virgina.
Berry Jr., Willie Wendell; Final Office Action dated Jan. 3, 2024; U.S. Appl. No. 17/303,607; United States Patent and Trademark Office; Alexandria, Virginia.
Elahmadi, Zakaria; Non-Final Office Action dated Jan. 19, 2024; U.S. Appl. No. 17/303,603; United States Patent and Trademark Office; Alexandria, Virginia.
Elahmadi, Zakaria; Final Rejection dated Feb. 15, 2024; U.S. Appl. No. 17/303,603; United States Patent and Trademark Office; Alexandria, Virginia.
Hinders, John; Continuation U.S. Appl. No. 18/611,898 entitled "Operator Control System for a Materials Handling Vehicle"; filed Mar. 21, 2024; United States Patent and Trademark Office; Alexandria, Virginia.
Hinders, John; Divisional U.S. Appl. No. 18/588,445 entitled "Operator Control System for a Materials Handling Vehicle"; filed Feb. 27, 2024; United States Patent and Trademark Office; Alexandria, Virginia.
Hinders, John; Divisional U.S. Appl. No. 18/590,154 entitled "Operator Control System for a Materials Handling Vehicle"; filed Feb. 28, 2024; United States Patent and Trademark Office; Alexandria, Virginia.
Elahmadi, Zakaria; Notice of Allowance and Fees Due dated Mar. 25, 2024; U.S. Appl. No. 17/303,603; United States Patent and Trademark Office; Alexandria, Virginia.

* cited by examiner

ORDER PICKER MATERIALS HANDLING VEHICLE WITH IMPROVED DOWNWARD VISIBILITY WHEN DRIVING ELEVATED

RELATED APPLICATIONS

This application is a continuation of U.S. patent application Ser. No. 16/406,122, filed May 8, 2019, entitled "ORDER PICKER MATERIALS HANDLING VEHICLE WITH IMPROVED DOWNWARD VISIBILITY WHEN DRIVING ELEVATED," which is a division of U.S. patent application Ser. No. 14/935,528, filed Nov. 9, 2015 and entitled "ORDER PICKER MATERIALS HANDLING VEHICLE WITH IMPROVED DOWNWARD VISIBILITY WHEN DRIVING ELEVATED," the entire disclosure of the above-noted applications are incorporated herein by reference in their entirety.

FIELD OF THE INVENTION

The present invention relates to a materials handling vehicle and, more particularly, to a materials handling vehicle having an operator compartment supported on a mast assembly including plural telescoping sections.

BACKGROUND OF THE INVENTION

Known materials handling vehicles include a power unit, a mast assembly and an operator compartment. The mast assembly may include a plurality of mast weldments, wherein a first mast weldment may be fixed to the power unit and one or more weldments may be supported for telescoping movement relative to the other weldments. The operator compartment in a stock picker materials handling vehicle may be supported for vertical movement on the mast assembly for positioning an operator to retrieve items from shelves at elevated locations.

SUMMARY OF THE INVENTION

In accordance with an aspect of the invention, a materials handling vehicle is provided comprising a power unit supported on wheels, and a mast assembly is supported on the power unit. The mast assembly includes plural telescoping sections defined by pairs of laterally spaced rails. An operator compartment is supported on the mast assembly for vertical movement, and a dash is located forward of the operator compartment and includes a substantially horizontal support surface for packages. A transparent window defines a portion of the horizontal support surface and provides the operator with a view of a floor surface when the operator compartment is in an elevated position such that the operator does not need to move his head outside the perimeter of the vehicle when looking down.

At least one control device may be associated with the dash for operation by an operator positioned standing on the operator compartment.

An uppermost end of the mast assembly may be located no higher than the horizontal support surface when the mast assembly is in a lowered position.

The control device may be centered between the pairs of laterally spaced rails of the telescoping sections of the mast assembly.

A load tray may be positioned forward of the dash.

A front wall may define a side of the operator compartment adjacent to the mast assembly and the dash may extend forward of the front wall.

The transparent window may be located directly over the mast assembly.

The transparent window may include a pair of transparent panels extending forward from either side of the control device.

The transparent window may extend between first and second control devices.

In accordance with another aspect of the invention, a materials handling vehicle is provided comprising a power unit supported on wheels, and a mast assembly supported on the power unit. The mast assembly includes plural telescoping sections defined by pairs of laterally spaced rails. An operator compartment is supported on the mast assembly for vertical movement relative to the mast assembly, and a dash is located adjacent the operator compartment. At least one control device is associated with the dash for operation by an operator positioned standing on the operator compartment, and the at least one control device is positioned generally between the pairs of laterally spaced rails.

A load tray may be positioned forward of the dash.

The dash may define a horizontal support surface including a transparent window extending on either side of the control device between the operator compartment and the load tray.

A front wall may be provided defining a side of the operator compartment adjacent to the mast assembly, and the laterally spaced rails may have a height no greater than a height of the front wall.

An auxiliary load carrying member may be positioned rearward of the operator compartment. The auxiliary load carrying member may comprise forks. The auxiliary load carrying member may comprise an auxiliary lift operable to move the forks vertically. The auxiliary load carrying member may comprise a storage rack with vertically arranged storage shelves.

In accordance with a further aspect of the invention, a materials handling vehicle is provided comprising a power unit supported on wheels, and a mast assembly supported on the power unit. The mast assembly includes four or more telescoping sections defined by pairs of laterally spaced rails. An operator compartment is supported on the mast assembly for vertical movement relative to the mast assembly and includes a front wall defining a side of the operator compartment adjacent to the mast assembly. The laterally spaced rails have a height that is generally equal to the height of the front wall. A dash is located adjacent to the operator compartment.

At least one control device may be associated with the dash for operation by an operator positioned standing on the operator compartment.

A load tray may be positioned forward of the dash.

The laterally spaced rails may have a collapsed height of no more than about 1200 mm relative to a floor surface supporting the wheels of the vehicle.

The dash may include a transparent window located directly over the mast assembly.

The telescoping sections may comprise at least first, second, third and fourth weldments, the first weldment may comprise a weldment fixed to the power unit, and the second, third and fourth weldments may comprise movable weldments.

The materials handling vehicle may further comprise at least one first ram and cylinder assembly coupled to the second weldment and first lift structure associated with the first, second and third weldments such that the at least one first ram and cylinder assembly and the first lift structure effect movement of the second and third weldments relative to the first weldment. The vehicle may still further comprise at least one second ram and cylinder assembly coupled between the third and fourth weldments and second lift structure associated with the third weldment, the fourth weldment and the operator compartment such that the at least one second ram and cylinder assembly and the second lift structure effect movement of the fourth weldment and the operator compartment relative to the third weldment.

The first lift structure may comprise at least one lift pulley supported on the second weldment and at least one lift chain coupled to the first and third weldments. The second lift structure may comprise at least one lift pulley supported on the fourth weldment and at least one lift chain coupled to the third weldment and the operator compartment.

The control device may comprise a right-hand control and a left-hand control located over the mast between outer lateral edges of the mast.

The dash may be located extending in a forward direction from the operator compartment toward the mast assembly, and may include a substantially horizontal support surface for packages.

The horizontal support surface may extend, in both lateral and front-to-rear directions, the full extent of the lateral and front-to-rear dimensions of the mast assembly.

A load tray may be provided positioned forward of the dash.

At least one control device may be associated with the dash for operation by the operator when the operator is positioned standing facing in the forward direction on the operator compartment.

The at least one control device may be located forward of the front wall.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
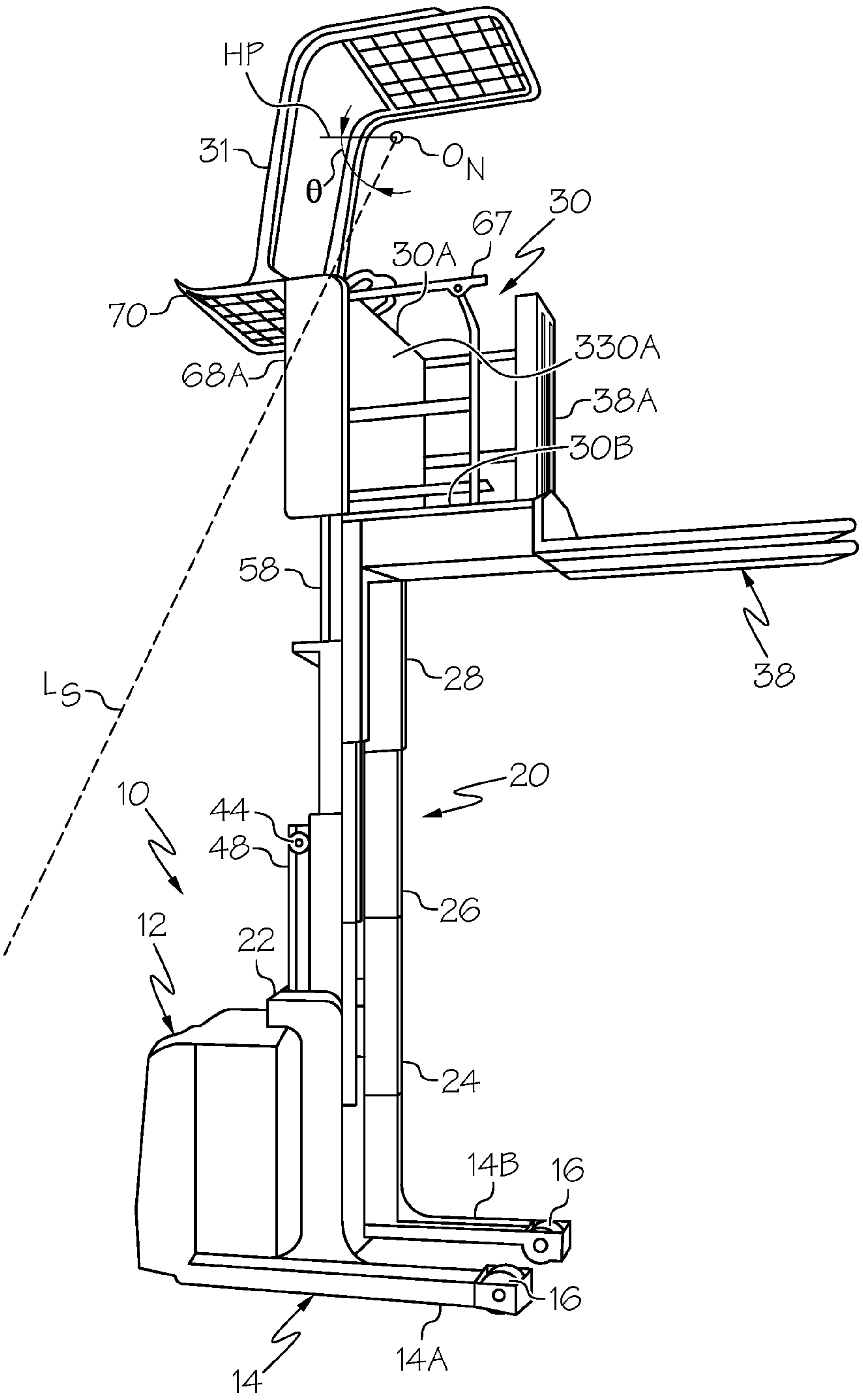
FIG. 1 is a perspective view of a materials handling vehicle having an operator compartment in an elevated position.

Reference is now made to FIG. 1, which illustrates a materials handling vehicle and more particularly an order picker vehicle 10, also referred to as a stock picker vehicle, and typically characterized by a compartment for moving an operator to selected elevated positions such as for picking items or containers from warehouse shelves. The vehicle 10 includes a battery powered power unit 12, a mast assembly 20, and an operator compartment 30 located on an opposite side of the mast assembly 20 from the power unit 12. The operator compartment 30 may also include an overhead guard 31. In one embodiment, a pair of forks 38 can extend outward from a rear edge of the operator compartment 30. The forks 38 may be welded to the operator compartment 30, hooked onto the operator compartment 30, or supported to an auxiliary mast 38A for vertical movement relative to the operator compartment 30, as depicted in FIG. 1. Other article carrying or storage configurations than forks 38 can be provided for supporting and/or storing articles at the rear of the vehicle 10, as is described further below.

The power unit 12 includes a frame 14 having straddle legs 14A, 14B supporting rear wheel assemblies 16. A front wheel assembly 18 is located under the power unit 12 and may comprise a powered and steered wheel, see FIG. 2B. The front wheel assembly 18 and rear wheel assemblies 16 enable the vehicle 10 to move across a floor surface.

Referring to FIGS. 1-4, the mast assembly 20 is supported on the power unit 12, connected to the frame 14, and includes plural telescoping sections forming, in the illustrated embodiment, a four stage mast comprising first, second, third and fourth weldments 22, 24, 26, 28. The first weldment 22 comprises a laterally outermost weldment, defining a mast weldment that is fixed to the power unit 12, and the second, third and fourth weldments 24, 26, 28 comprise movable weldments located successively inward from the first weldment 22. The first weldment 22 includes a pair of laterally spaced apart vertical first rails 22A, 22B, see FIG. 3A. The vertical first rails 22A, 22B are connected by an upper lateral cross brace 22C, and are rigidly fixed to the frame 14 such that the first weldment 22 does not move relative to the frame 14.

Figure 2A:
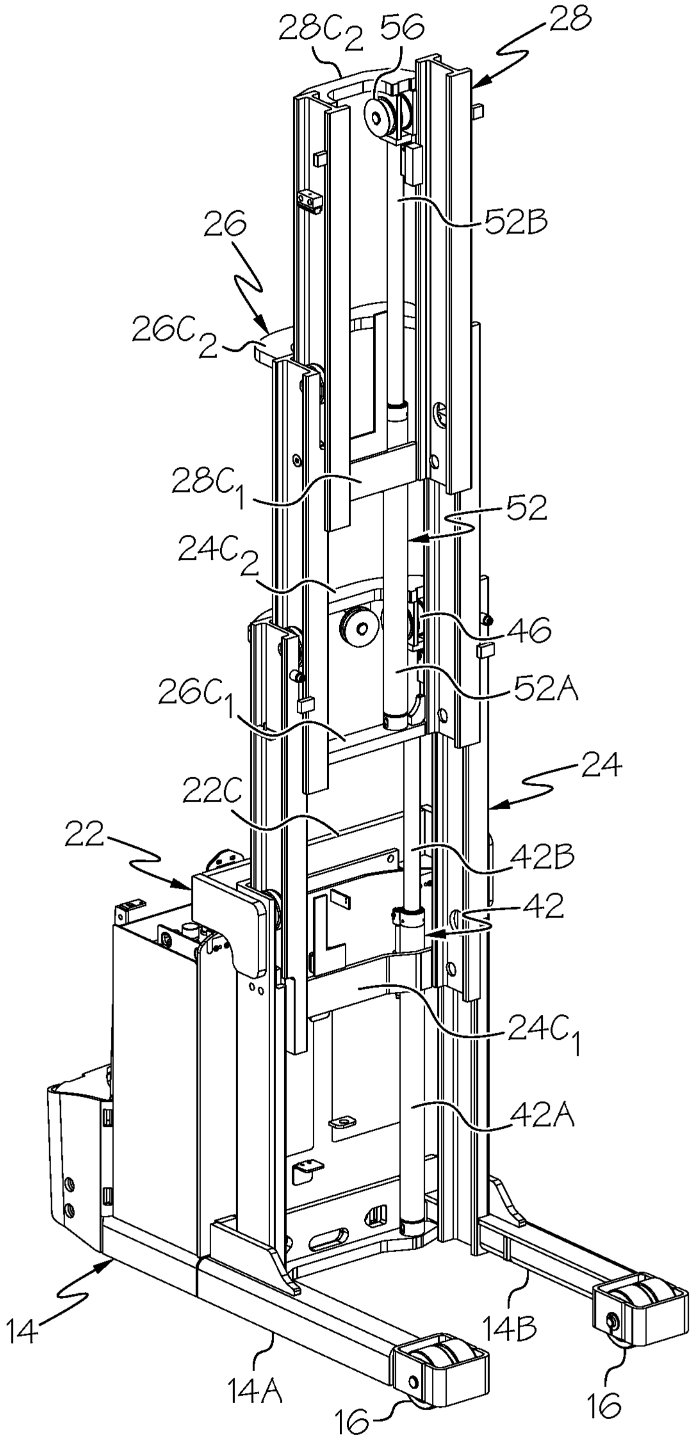
FIG. 2A is a perspective view of a mast assembly for the materials handling vehicle.
Figure 2B:
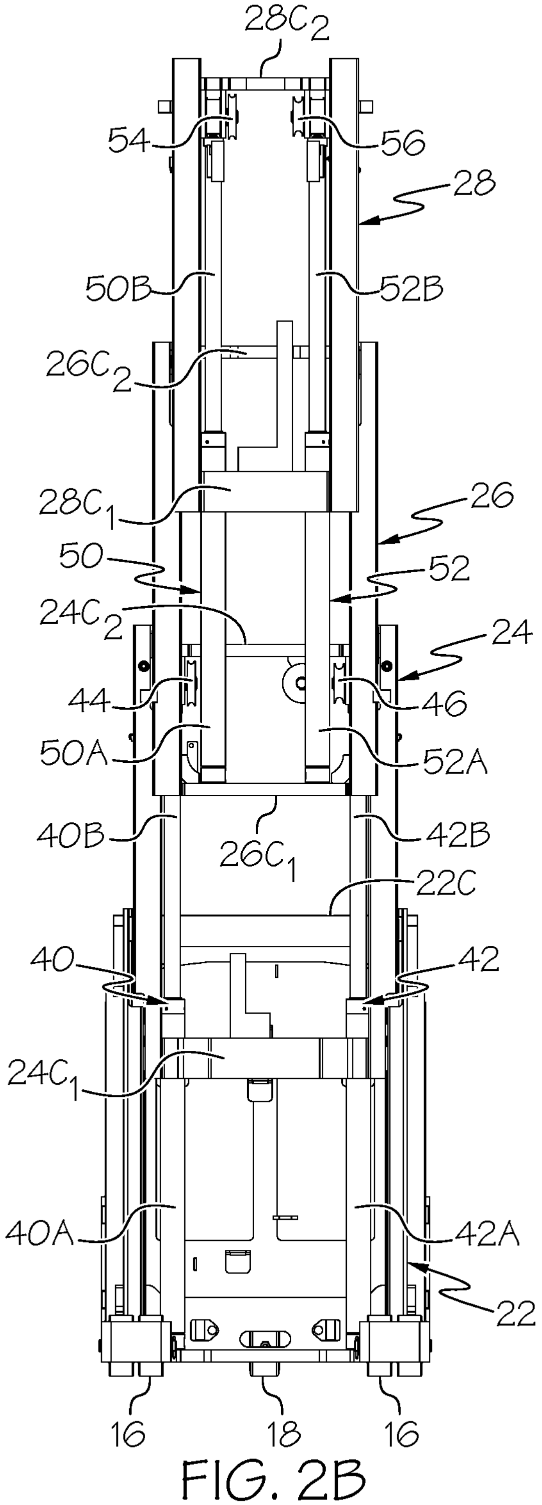
FIG. 2B is a rear to front elevation view of the mast assembly for the materials handling vehicle.
Figure 3A:
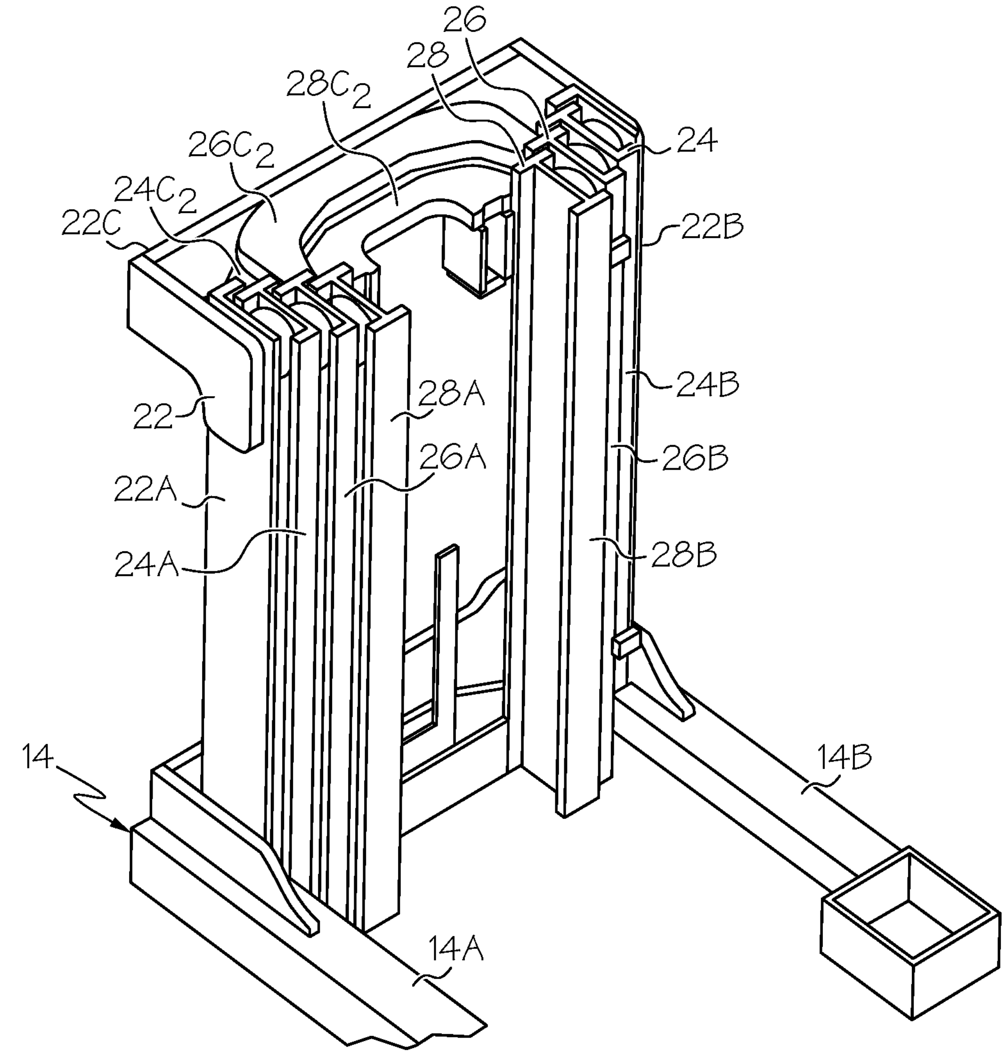
FIG. 3A is a perspective view of telescoping mast weldments for the materials handling vehicle.

The second weldment 24 comprises a pair of laterally spaced apart vertical second rails 24A, 24B, see FIG. 3A. The vertical second rails 24A, 24B are connected by a lower lateral brace 24$C_1$ and an upper lateral brace 24$C_2$, see FIGS. 2A and 2B. The vertical second rails 24A, 24B are at least partially located within and are vertically movable within channels defined by the vertical first rails 22A, 22B of the first weldment 22, i.e., the second weldment 24 is capable of vertical movement relative to the first weldment 22.

The third weldment 26 comprises a pair of laterally spaced apart vertical third rails 26A, 26B, see FIG. 3A. The vertical third rails 26A, 26B are connected by a lower lateral brace 26$C_1$ and an upper lateral brace 26$C_2$, see FIGS. 2A and 2B. The vertical third rails 26A, 26B are at least partially located within and are vertically movable within channels defined by the vertical second rails 24A, 24B of the second weldment 24, i.e., the third weldment 26 is capable of vertical movement relative to the second weldment 24.

The fourth weldment 28 comprises a pair of laterally spaced apart vertical fourth rails 28A, 28B. The vertical fourth rails 28A, 28B are connected by a lower lateral brace 28$C_1$ and an upper lateral brace 28$C_2$. The vertical fourth rails 28A, 28B are at least partially located within and are vertically movable within channels defined by the vertical third rails 26A, 26B of the third weldment 26, i.e., the fourth weldment 28 is capable of vertical movement relative to the third weldment 26.

Figure 3B:
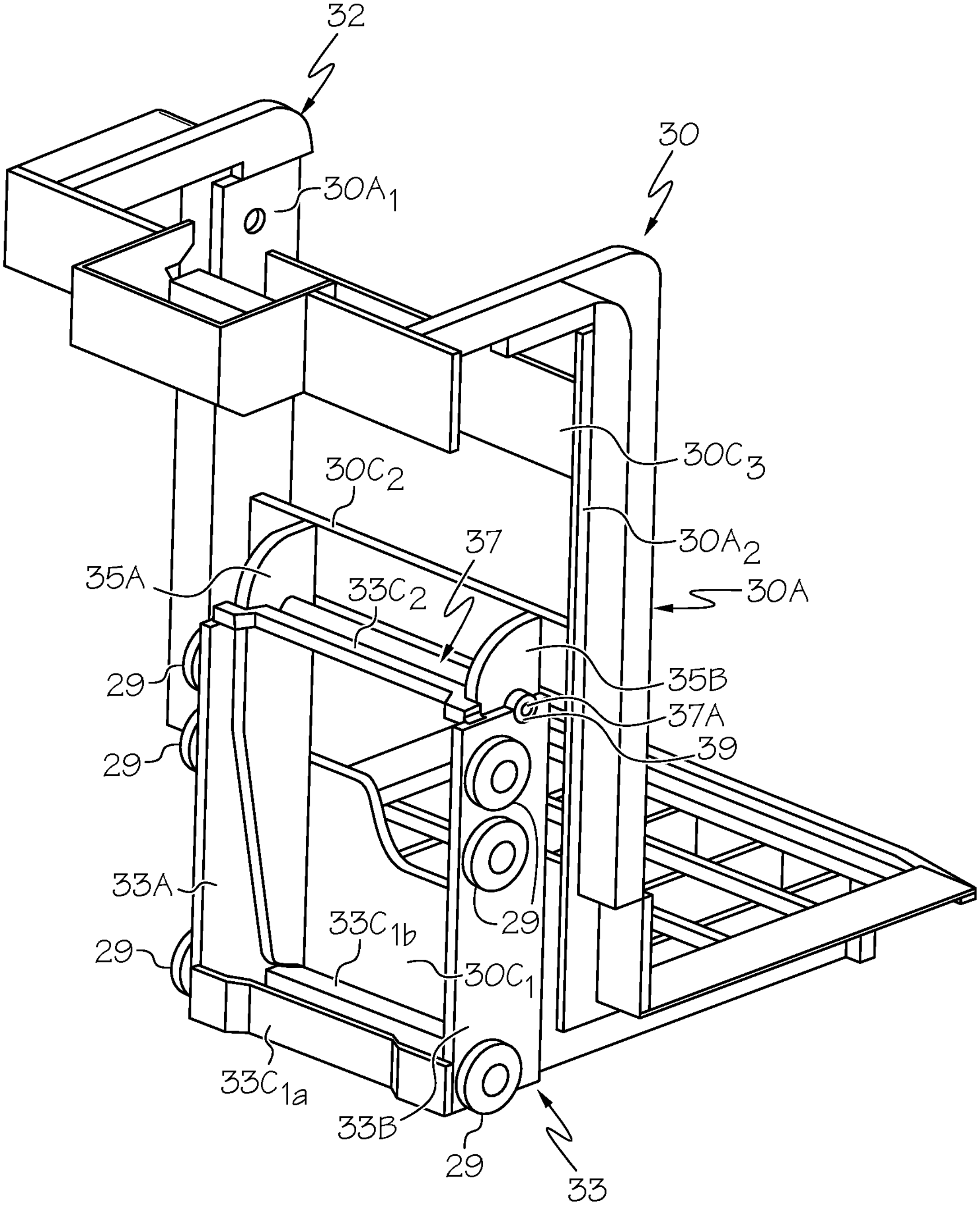
FIG. 3B is a perspective view of an operator compartment carriage and an operator compartment.

The operator compartment 30 comprises an operator support structure 32 and an operator compartment carriage 33 upon which the operator support structure 32 is supported, see FIG. 3B. The operator support structure 32 comprises a vertical front wall 30A rigidly connected to a horizontal operator platform 30B defining a floorboard on which an operator can stand, see FIG. 1. The operator compartment carriage 33 comprises a pair of laterally spaced apart vertical carriage rails 33A, 33B. The vertical carriage rails 33A, 33B are connected by a lower front lateral brace 33$C_{1a}$, a lower rear lateral brace 33$C_{1b}$ and an upper lateral brace 33$C_2$. The vertical carriage rails 33A, 33B include rollers 29 which are located within and are vertically movable within channels defined by the vertical fourth rails 28A, 28B of the fourth weldment 28.

Figure 6A:
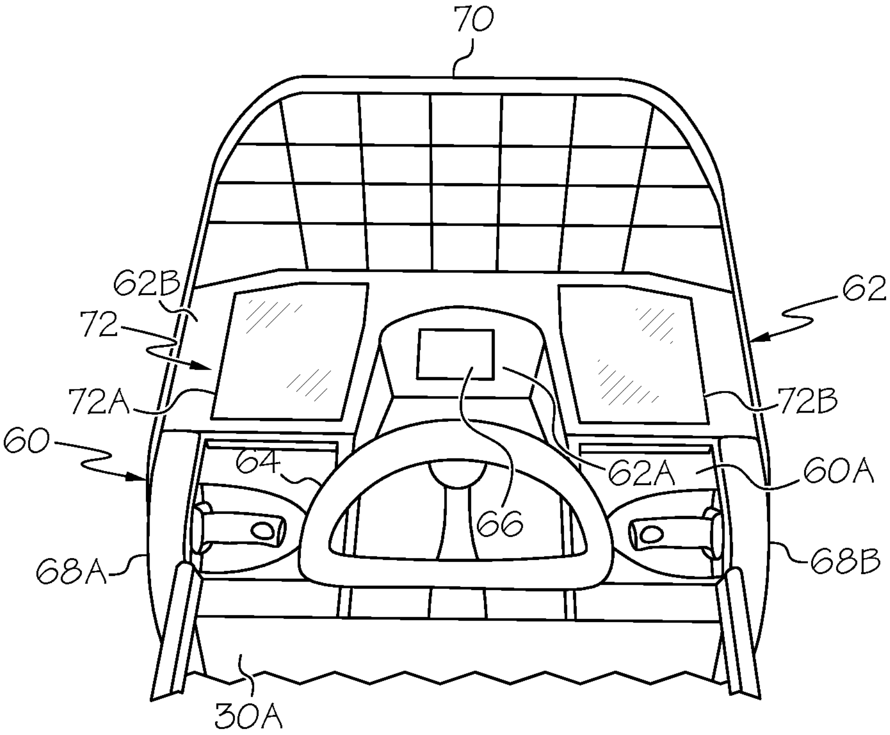
FIG. 6A is a perspective view of a control console for the materials handling vehicle.
Figure 6B:
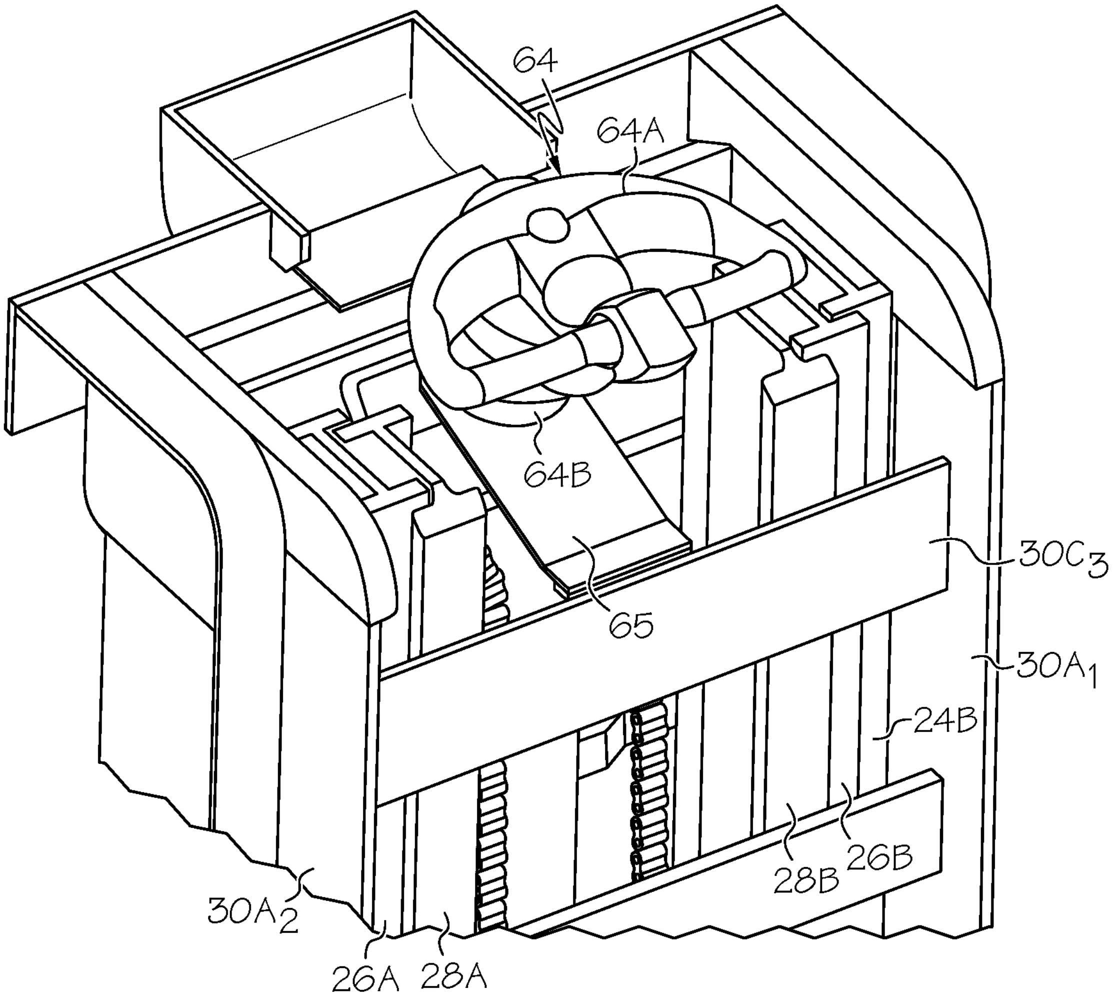
FIG. 6B is a perspective view of an upper end of the mast with the operator compartment in a lowered position and with a dash of the control console removed.

Referring to FIGS. 1 and 3B, the front wall 30A of the operator support structure 32 includes laterally spaced vertical front wall rails 30$A_1$, 30$A_2$ that are generally laterally aligned with the first vertical rails 22A, 22B of the first weldment 22, see FIG. 6B. The vertical front wall rails 30$A_1$, 30$A_2$ are connected by a lower cross brace 30$C_1$, a middle cross brace 30$C_2$ and an upper cross brace 30$C_3$. A front wall flat panel 330A is coupled to the braces 30$C_1$, 30$C_2$ and 30$C_3$, see FIG. 1. A pair of parallel vertical support plates 35A, 35B extend between and are connected to the lower and middle cross braces 30$C_1$, 30$C_2$.

A lateral bar 37 extends between upper ends of the support plates 35A, 35B. Opposing ends of the lateral bar 37 extend through the support plates 35A, 35B and define hooks 37A that rest in notches 39 (only one shown in FIG. 3B) formed in upper edges of the vertical carriage rails 33A, 33B. The operator support structure 32 is secured to the operator compartment carriage 33 by screws (not shown) connecting the lower rear lateral brace 33$C_{1b}$ of the operator compartment carriage 33 to the lower cross brace 30$C_1$ of the front wall 30A.

Referring to FIGS. 1, 2A and 2B, the mast assembly 20 further comprises a first pair of lift ram/cylinder assemblies 40, 42 provided for effecting movement of the second and third weldments 24, 26 relative to the first weldment 22. Bottom portions of cylinders 40A, 42A of the first pair of ram/cylinder assemblies 40, 42 in the illustrated embodiment are coupled to the frame 14. Rams 40B, 42B are housed within the cylinders 40A, 42A and extend from the cylinders 40A, 42A under the control of pressurized hydraulic fluid, and are fixed to the upper lateral cross brace 24$C_2$ of the second weldment 24. The first pair of ram/cylinder assemblies 40, 42 are axially located forward of the first vertical rails 22A, 22B and the second vertical rails 24A, 24B, and the upper lateral cross brace 24$C_2$ is configured as a U-shaped brace extending forward of the second vertical rails 24A, 24B and vertically aligned with the rams 40B, 42B for connection to the rams 40A, 42B.

Figure 2C:
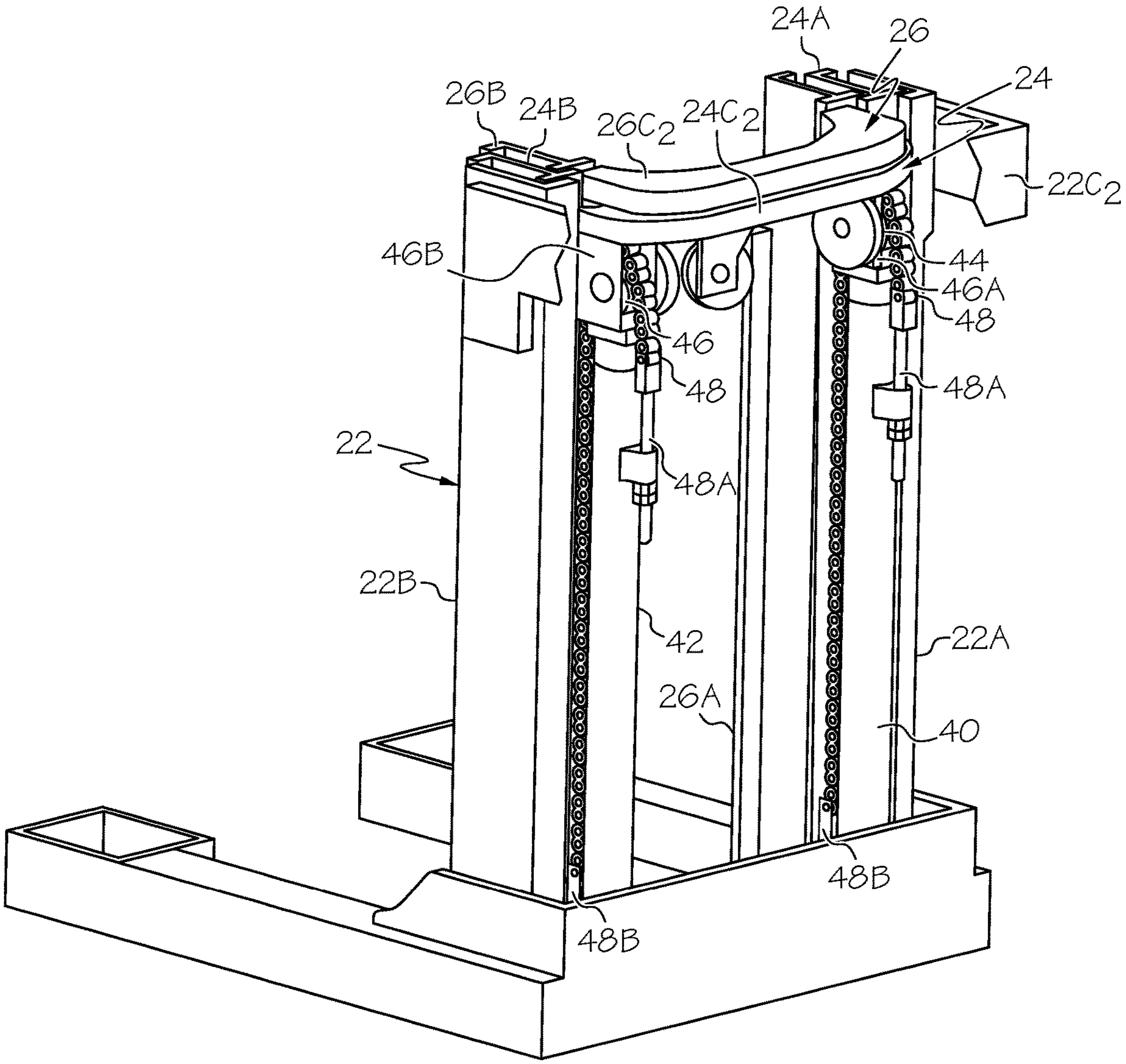
FIG. 2C is a perspective view of a first weldment, a second weldment and a third weldment of the mast assembly for the materials handling vehicle.

Referring to FIG. 2C, the mast assembly 20 further comprises a first pair of first and second lift pulleys 44, 46 supported by respective pulley brackets 46A, 46B to the upper end of the second weldment 24 extending downward from the upper lateral cross brace 24$C_2$. The first and second lift pulleys 44, 46 are located forward of the first, second and third weldments 22, 24, 26, and the first and second pulleys 44, 46 are positioned generally directly over the first pair of ram/cylinder assemblies 40, 42. A first pair of lift chains 48 extend about the respective lift pulleys 44, 46. The lift chains 48 include first ends 48A affixed in stationary relation to the first weldment 22, and may be connected to the first pair of ram/cylinder assemblies 40, 42, and the lift chains 48 include second ends 48B connected to the third vertical rails 26A, 26B adjacent to the lower end of the third weldment 26, see FIG. 2C.

The first pair of lift chains 48 and the first pair of lift pulleys 44, 46 operate in combination with the first pair of lift ram/cylinders 40, 42 to effect movement of the second and third weldments 24, 26. Specifically, when the rams 40B, 42B of the first pair of lift ram/cylinders 40, 42 are extended, the rams 40B, 42B lift the second weldment 24 relative to the first weldment 22, and the pulleys 44, 46 which are affixed to the second weldment 24 apply upward forces on the chains 48 causing the third weldment 26 to move vertically relative to the first and second weldments 22, 24. More specifically, while the rams 40B, 42B are being extended, the third weldment 26 moves vertically two units relative to the fixed first weldment 22 while the second weldment 24 moves vertically one unit relative to the fixed first weldment 22.

Referring to FIGS. 1, 2A and 2B, the mast assembly 20 further comprises a second pair of lift ram/cylinder assemblies 50, 52 provided for effecting movement of the fourth weldment 28 and the operator compartment 30 relative to the third weldment 26. Bottom portions of cylinders 50A, 52A of the second pair of ram/cylinder assemblies 50, 52 in the illustrated embodiment are coupled to the lower lateral cross brace 26$C_1$ of the third weldment 26. Rams 50B, 52B are housed within the cylinders 50A, 52A and extend from the cylinders 50A, 52A under the control of pressurized hydraulic fluid, and are fixed to the upper lateral cross brace 28$C_2$ of the fourth weldment 28. The second pair of ram/cylinder assemblies 50, 52 are axially located forward of the third vertical rails 26A, 26B and the fourth vertical rails 28A, 28B, and are located axially rearward of the first pair of lift ram/cylinder assemblies 40, 42, see FIG. 2A. The upper lateral cross brace 28$C_2$ is configured as a U-shaped brace extending forward of the fourth vertical rails 28A, 28B and vertically aligned with the rams 50B, 52B of the second pair of ram/cylinder assemblies 50, 52.

Figure 2D:
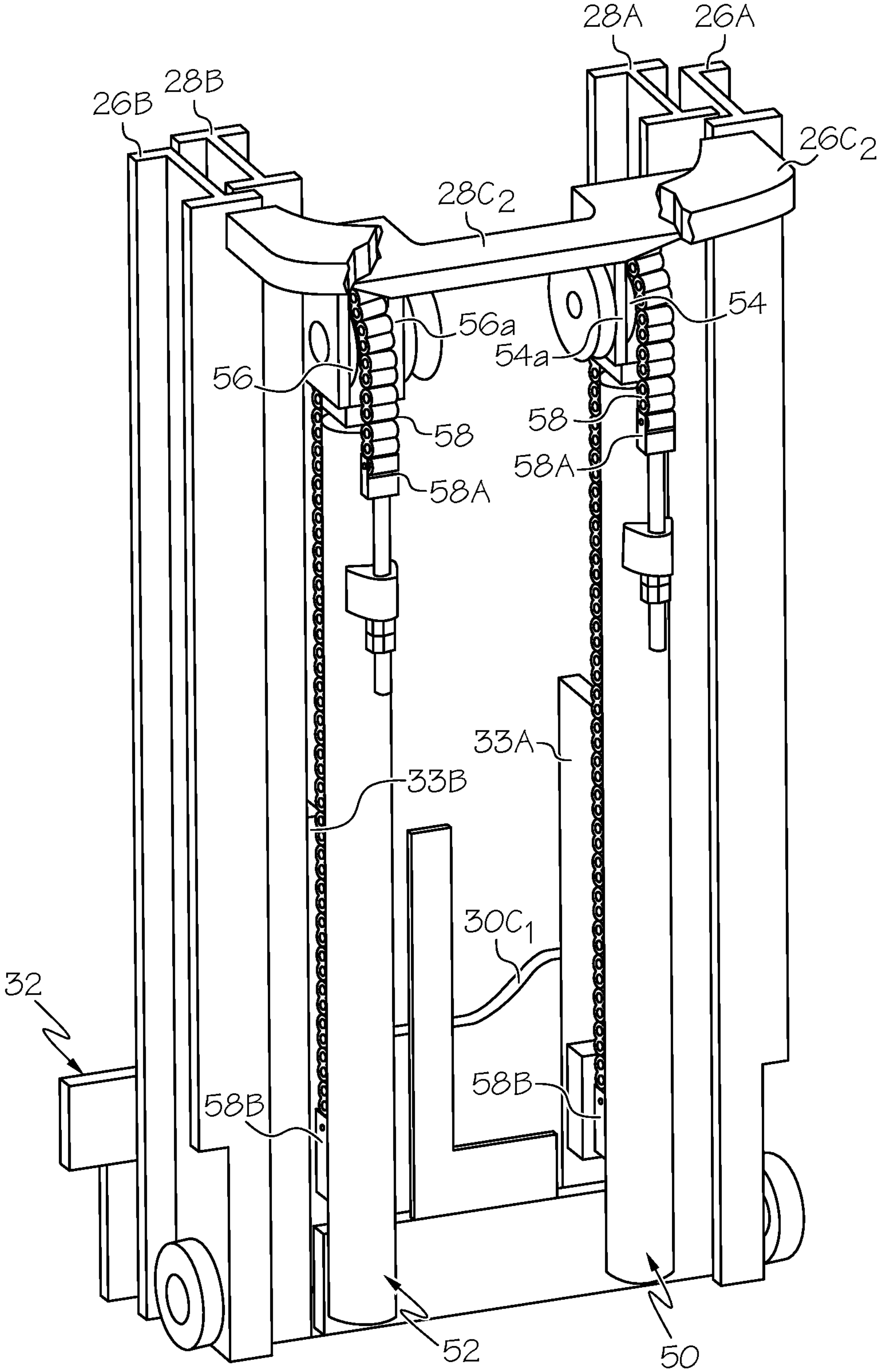
FIG. 2D is a perspective view of the third weldment and a fourth weldment of the mast assembly for the materials handling vehicle.

Referring to FIG. 2D, the mast assembly 20 further comprises a second pair of first and second lift pulleys 54, 56 supported by respective pulley brackets 54*a*, 56*a* extending downward from the upper lateral cross brace $28C_2$ of the fourth weldment 28. The second pair of first and second lift pulleys 54, 56 are located forward of the first, second and third weldments 22, 24, 26, and the first and second pulleys 54, 56 are positioned generally directly over the second pair of ram/cylinder assemblies 50, 52. A second pair of lift chains 58 extend about the respective lift pulleys 54, 56. The lift chains 58 include first ends 58A affixed in stationary relation to the third weldment 26, and may be connected to the second pair of ram/cylinder assemblies 50, 52 and the lift chains 58 include second ends 58B connected to lower portions of the vertical carriage rails 33A, 33B of the operator compartment carriage 33.

The second pair of lift chains 58 and the second pair of lift pulleys 54, 56 operate in combination with the second pair of lift ram/cylinders 50, 52 to effect movement of the fourth weldment 28 and the operator compartment 30 relative to the third weldment 26. Specifically, when the rams 50B, 52B of the second pair of lift ram/cylinders 50, 52 are extended, the rams 50B, 52B lift the fourth weldment 28 relative to the third weldment 26, and the pulleys 54, 56 which are affixed to the fourth weldment 28 apply upward forces on the chains 58 causing the operator compartment 30 to move vertically relative to the third and fourth weldments 26, 28 of the mast assembly 20 via the chains 58 applying upward lifting forces to the vertical carriage rails 33A, 33B of the operator compartment carriage 33. More specifically, while the rams 50B, 52B are being extended, the operator compartment 30 moves vertically two units relative to the third weldment 26 while the fourth weldment 28 moves vertically one unit relative to the third weldment 26.

Figure 5:
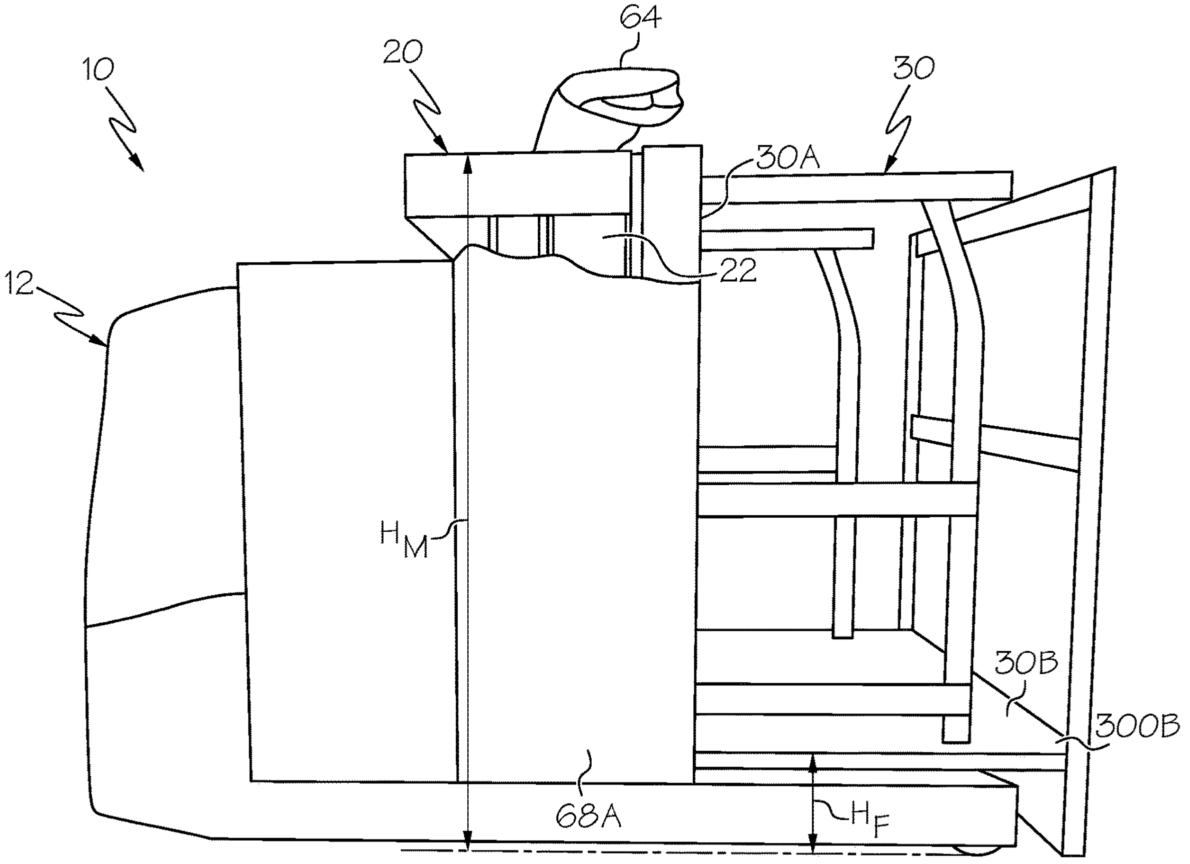
FIG. 5 is a side elevation view of the materials handling vehicle with operator compartment in a lowered position and with an operator compartment side wall partially cut away to expose the mast assembly.

In the illustrated embodiment, the described four stage mast assembly may be operated to elevate the operator compartment, i.e., an upper surface 300B of the horizontal operator platform 30B, to a maximum height of about 3000 mm relative to the floor surface, i.e., relative to a contact between the floor surface and lower surfaces of wheels of the vehicle wheel assemblies 16, 18. Further, in accordance with an aspect of the invention, the mast assembly 20 has a collapsed height that is no greater than, and is generally equal to, the height of the front wall 30A of the operator compartment when the mast assembly 20 is in a lowered position. In a particular illustrated embodiment, in a collapsed configuration of the mast assembly 20, the upper ends of the laterally spaced rails of the mast weldments 22, 24, 26, 28 have a height, HM, of no more than about 1200 mm relative to the floor surface, see FIG. 5. Further, when the mast assembly 20 is in the collapsed configuration of that particular illustrated embodiment, the floorboard of the operator platform 30B has a height, HF, that is about 200 mm. Hence, as is described in greater detail below, none of the rails of the mast weldments 22, 24, 26, 28 are in the field of view of the operator when the mast assembly 20 is collapsed and the vehicle 10 is being operated, i.e., the mast assembly rails 22A, 22B, 24A, 24B, 26A, 26B, 28A, 28B do not extend upwardly so as to obstruct an operator's field of view looking in a forward direction, e.g., in the direction opposite to the forks 40. The maximum elevated height for the operator compartment and the height of the collapsed mast assembly 20 may vary from the heights noted above and used in the illustrated embodiments. For example, the maximum elevated height may fall within a range of from about 1200 mm to about 3000 mm, depending on the number of mast rail sections. In addition, the collapsed height of the mast assembly 20 may fall within a range of from about 1000 mm to about 1500 mm and preferably has a height of 1200 mm, and the height of the operator platform 30B, in the collapsed configuration, may fall within a range of from about 100 mm to about 350 mm and preferably has a height of 200 mm.

Referring to FIG. 6A, an operator console 60 is located on a forward side of the operator compartment 30 adjacent an upper edge and extending forward of the front wall 30A. The operator console 60 includes a dash 62 and at least one control device 64 positioned on the dash 62 in the FIG. 6A embodiment. The control device 64 is located at a rear section 60A of the operator console 60, and is laterally positioned centrally between the pairs of laterally spaced rails 22A, 22B, 24A, 24B, 26A, 26B, 28A, 28B for operation by an operator standing on the operator platform 30B, see also FIG. 6B. The control device 64 comprises a steering handle 64A and a shaft 64B about which the steering handle 64A rotates. A control device bracket 65 extends forward from the upper cross brace $30C_3$ of the front wall 30A to a location underneath the dash 62 and supports a lower end of the shaft 64B of the control device 64. The shaft 64B extends upward from a location between the pairs of laterally spaced rails 22A, 22B, 24A, 24B, 26A, 26B, 28A, 28B.

The dash 62 can include a central region 62A extending forward of the control device 64, toward the power unit 12, and forming an upper recessed area defining a cavity for a display 66 facing rearward toward the operator. The dash 62 further defines a horizontal support surface 62B located directly over the mast assembly 20 for supporting items during a picking process, e.g. for supporting packages and other items. The horizontal support surface 62B defined by the dash 62 can generally extend, in both the lateral and front-to-rear directions, the full extent of the lateral and front-to-rear dimensions of the mast assembly 20. The horizontal support surface 62B provides an unobstructed surface for resting items during a picking process, located at a convenient height for an operator to lift or maneuver items to or from the surface 62B. In particular, in a lowered or collapsed position of the mast assembly 20, the mast assembly 20 is no higher than the horizontal support surface 62B, and thus does not extend through or above the horizontal support surface 62B to obstruct the horizontal support surface 62B. Further, because the mast assembly 20 is limited in height, i.e., has a collapsed height, HM, no greater than 1200 mm in the preferred embodiment, the horizontal support surface 62B can be located at a height close to the upper end of the front wall 30A, such that an elevation of the support surface 62B may be at a convenient height for an operator to move items to the support surface 62B during a picking process. For example, the support surface 62B may be located at a height, Hs, less than an elbow height, HE, of an average-sized operator when operating the vehicle 10, to facilitate placement of items on the support surface 62B, see FIG. 7. In addition, the operator compartment 30 may include side rails 67 which are no higher than the horizontal support surface 62B.

Figure 4:
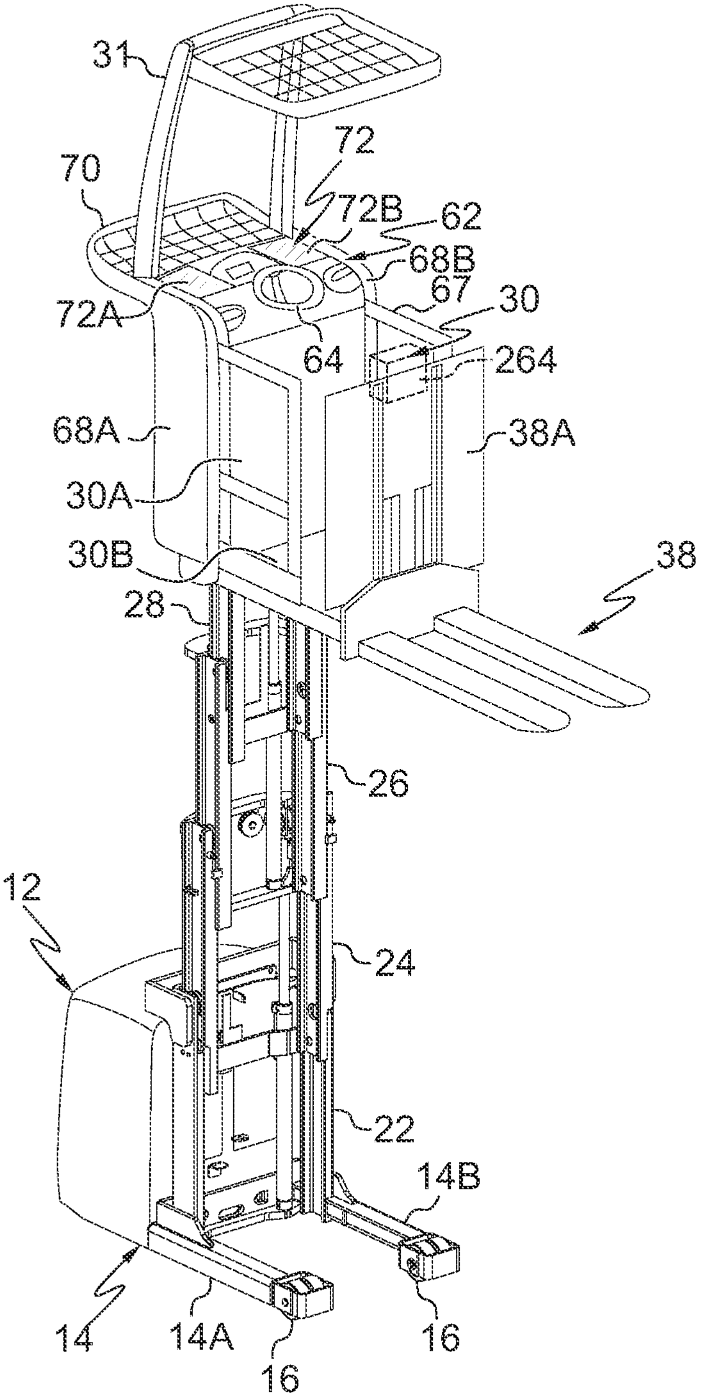
FIG. 4 is a further perspective view of a materials handling vehicle having an operator compartment in an elevated position.

Referring to FIGS. 4 and 6A, it may be noted that the operator compartment 30 can further include side walls 68A, 68B extending forward of the front wall 30A, and positioned adjacent outer sides of the vertical first rails 22A, 22B when the mast assembly 20 is collapsed. Load tray 70 is supported to the operator compartment 30 forward of the dash 62 and can be formed integrally with and supported by the side walls 68A, 68B or supported separately to the forward side of the dash 62. The load tray 70 extends over the power unit 12, forward of the mast assembly 20, and provides a further support structure continuous with and at generally the same height as the support surface 62B defined by the dash 62 for supporting items during a picking process. The load tray 70 can be formed with a grid or mesh support surface so as to not obstruct an operator's view forward of the dash 62.

The control device 64 may be operated by the operator standing on the operator platform 30B to control the speed and steering direction of the vehicle 10, as well as operator platform lift and lower, horn operation and braking. In addition, on embodiments of the vehicle 10 that include the forks 38 supported to the auxiliary mast 38A, the control device 64 can control lift and lower of the forks 38. Referring to FIG. 6A, the dash 62 includes a transparent window 72 defining a portion of the horizontal support surface 62B enabling the operator to look down during operation of the vehicle 10. In the illustrated embodiment, the transparent window 72 comprises first and second window panels 72A, 72B defined by panels of transparent material located in lateral regions of the dash 62, extending forward from either side of the control device 64. As part of the horizontal support surface 62B, the transparent window 72 is located directly over the mast assembly 20 and provides a view through a substantial portion, i.e., a majority, of an outer third of the dash 62 on either side of the recess 62A in the dash 62. The window panels 72A, 72B are formed as substantially flat lateral regions, facilitating an operator easily sliding a box or other flat item onto the window panels 72A, 72B as support surfaces. As an alternative to the separate window panels 72A, 72B, it is contemplated that the dash 62 may be configured without the recess 62A, and the transparent window 72 may span the area depicted by the window panels 72A, 72B and the area between the panels 72A, 72B as a continuous window.

The window 72 enables an operator to maintain his head within the perimeter of the operator compartment 30 during operation of the vehicle 10, and to look downward through the window 72 to view a greater portion of the area close to the power unit 12 and adjacent aisle structure. For example, the window 72 can provide the operator a line-of-sight, Ls, at downward viewing angle, θ, of up to about 80 degrees relative to a horizontal plane HP when standing in a normal upright operating position, depicted by reference ON, see FIG. 1. Further, the operator can lean forward toward the window 72 to view at a steeper angle in order to see the power unit 12 and its relationship to aisle structure. Hence, the operator compartment 30 can be fully elevated, e.g., positioning the operator platform 30B to about 3000 mm above the floor, and the operator can look down through the window 72 to better determine the location of the power unit 12 relative to adjacent aisle structure to avoid impacts during movement of the vehicle 10.

Figure 6C:
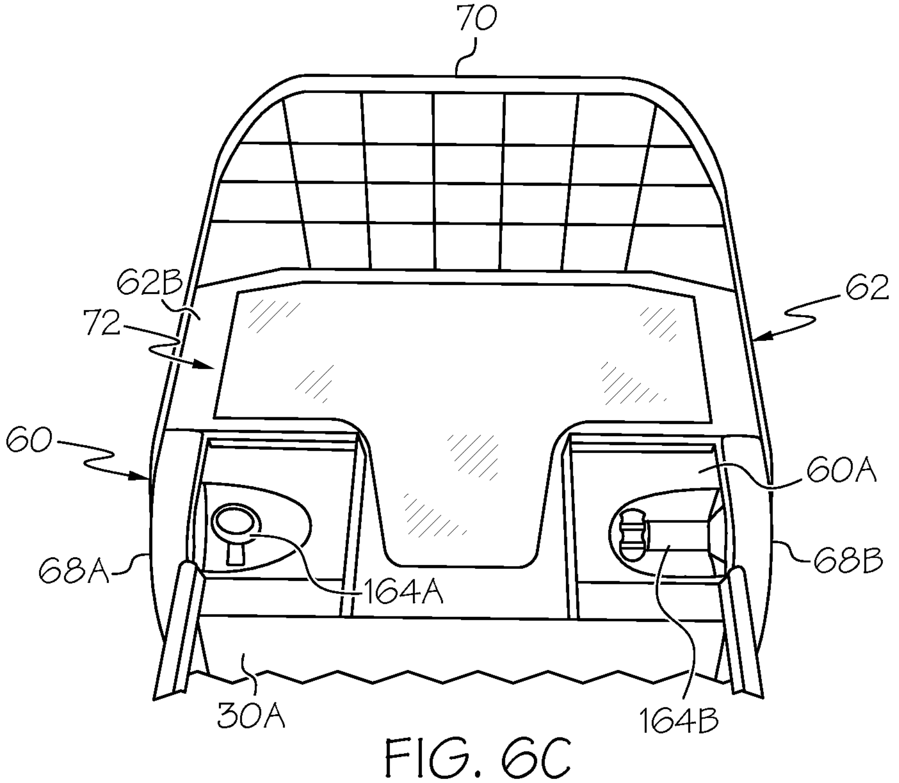
FIG. 6C is a perspective view of a control console for a material handling vehicle constructed in accordance with an alternative embodiment including a left-hand steering wheel and a right-hand traction control.
Figure 7:
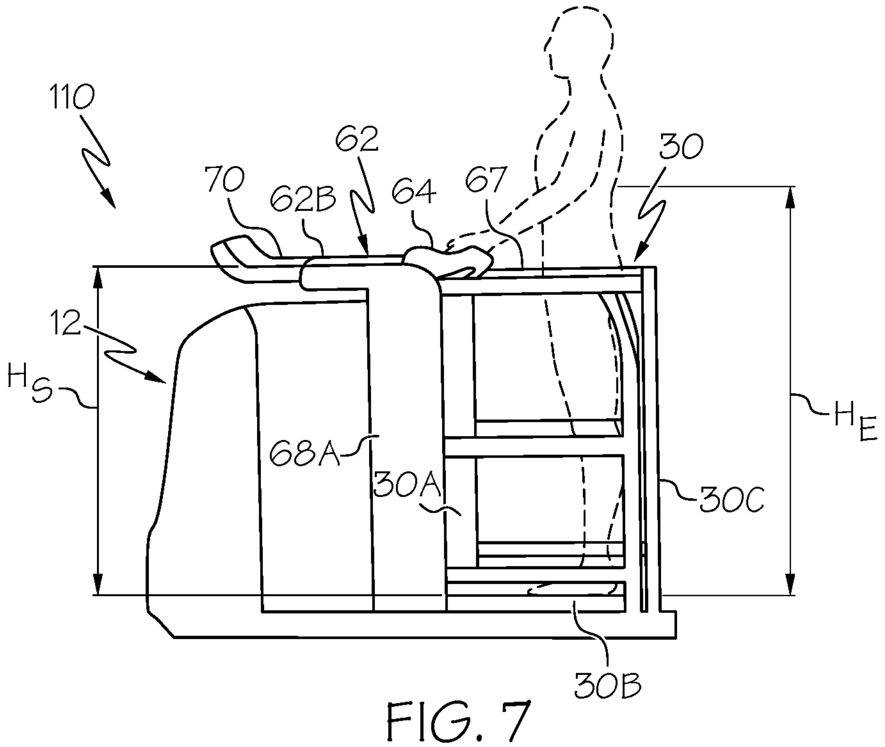
FIG. 7 is a side elevation view of an alternative configuration of a materials handling vehicle and illustrating an operator compartment in a lowered position.
Figure 8:
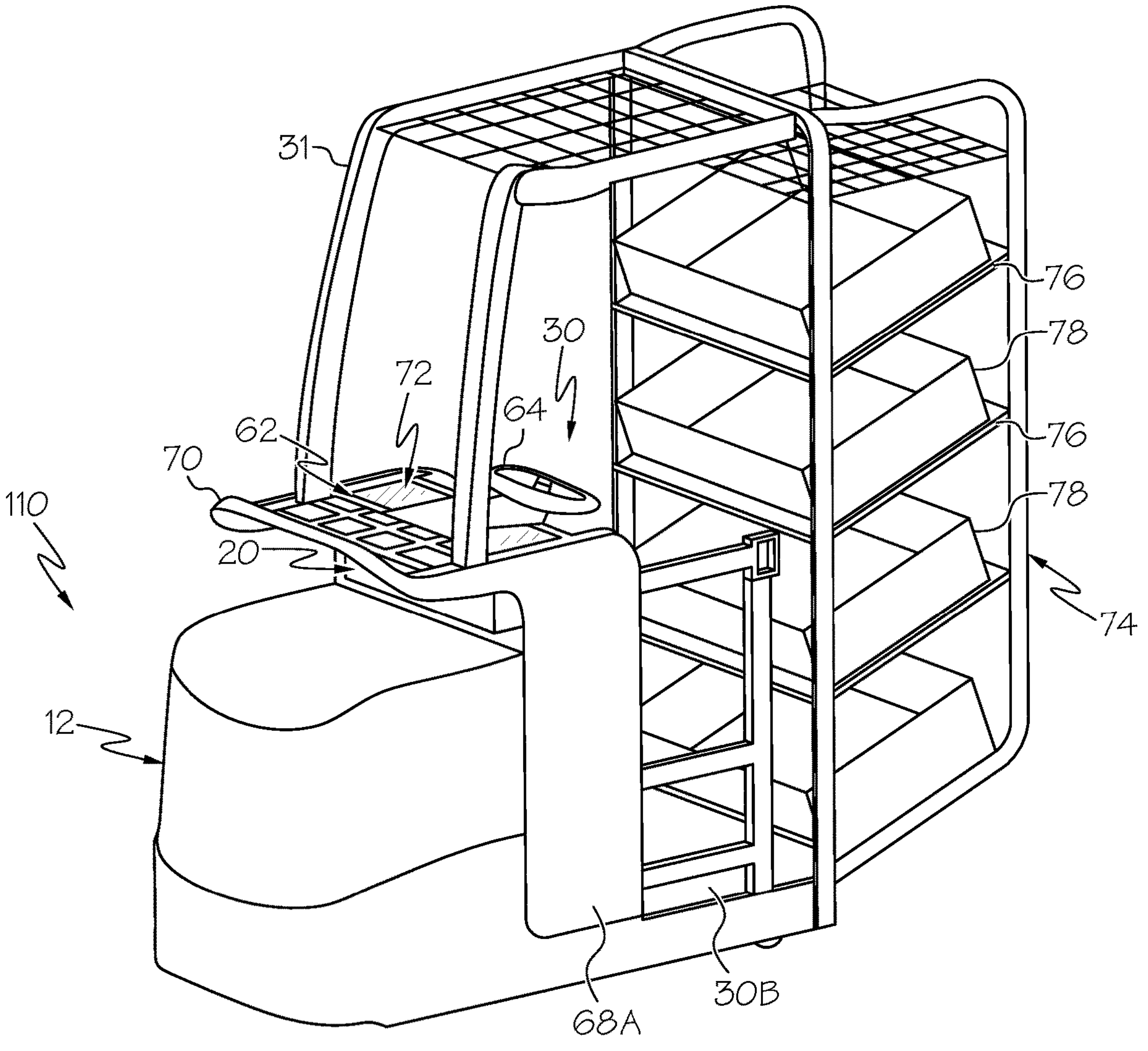
FIG. 8 is a perspective view of a further alternative configuration of a materials handling vehicle.

It should be noted that the control device 64 may comprise other configurations than illustrated herein. For example, the control device 64 may be configured with plural control units (also referred to herein as control devices) such as a left-hand steering wheel 164A positioned on the dash 62, and a right-hand traction control 1648, both positioned for two-handed operation of the vehicle 10, see FIG. 6C. In a configuration with left-hand and right-hand control units 164A and 164B, the transparent window 72 can extend centrally on the dash 62 between the control units. The window 72 comprises a single piece window in this illustrated embodiment. The window 72 may be formed from glass or a clear polymeric material. The left-hand and right-hand control units 164A and 164B can be located forward of the front wall 30A over the mast 20 and laterally between outer lateral edges of the mast 20, as defined by the vertical first rails 22A, 22B of the first weldment 22. Further alternative configurations and/or placement of the control device 64 or control devices 164A, 164B may be provided. For example, all control functions for the vehicle 10 may be controlled from a control device, shown schematically in dotted line by control device 264, which is mounted to an upper part of the auxiliary mast 38A. Additionally, some or all functions of the vehicle 10 could be controlled from control devices located on both sides of the operator compartment 30, such as may be provided by the control device 64 or control devices 164A, 164B located on the dash 62 and a control device or control devices (not shown), having similar functions to control device 64 or control devices 164A, 164B, located on an upper part of the auxiliary mast 38A to provide dual controls for the vehicle 10. Referring to FIGS. 7 and 8, an alternative configuration of the order picker vehicle is shown, identified as vehicle 110, in which the vehicle 110 is configured without forks on the rearward side of the vehicle 110 and may be used for picking smaller items. In all other respects with regard, for example, to the power unit 12, mast 20, and operator compartment 30, the vehicle 110 can be the same as the previously described vehicle 10, and corresponding elements are labeled with the same reference numerals as for vehicle 10.

Referring to FIGS. 7 and 8, an alternative configuration of the order picker vehicle is shown, identified as vehicle 110, in which the vehicle 110 is configured without forks on the rearward side of the vehicle 110 and may be used for picking smaller items. In all other respects with regard, for example, to the power unit 12, mast 20, and operator compartment 30, the vehicle 110 can be the same as the previously described vehicle 10, and corresponding elements are labeled with the same reference numerals as for vehicle 10.

As previously mentioned, the vehicle 110 does not include a fork structure such that the area behind the operator compartment can either be without a storage structure, as depicted in FIG. 7, or can be selectively provided with a storage structure that may be mounted to the rear of the operator compartment 30, as depicted in FIG. 8. As shown in FIG. 7, the operator compartment 30 may include a rear wall 30C and further can be configured without an overhead guard. Hence, the configuration of FIG. 6A eliminates overhead guard posts in the area of the dash 62 and can provide an operator with a fully unobstructed area forward of the dash 62 for the operator to move packages or other items onto the dash 62.

As shown in FIG. 8, a storage rack 74 is supported to the rear of the operator compartment 30 for vertical movement with the operator compartment 30. The storage rack 74 includes a plurality of vertically arranged shelves 76 that can be used to support bins 78, such as plastic totes, for holding small items. Various other storage structures may be mounted to the rear of the operator compartment 30 including, for example, a foldable storage rack (not shown).

It should be understood that although a particular configuration of the mast assembly 20 comprising four mast weldments 22, 24, 26, 28 is described herein, variations of the described mast structure may be provided to implement aspects of the invention. In an alternative configuration, an order picker vehicle 10 configured with a five or six stage mast assembly, i.e., comprising a fixed mast weldment and four or five movable mast weldments, may operate in accordance with aspects of the invention described herein. For example, a six stage mast assembly may be provided to elevate the operator compartment 30 to a height of about 4500 mm. It should be understood that in accordance with the aspects of the invention discussed above, all stages of the mast structure are no higher than the height of the horizontal support surface 62B of the operator compartment 30 and that the alternative mast structure(s) can provide the additional lift height while the collapsed height of the mast structure may fall within a range of from about 1000 mm to about 1500 mm and preferably has a height of 1200 mm.

Figure 9:
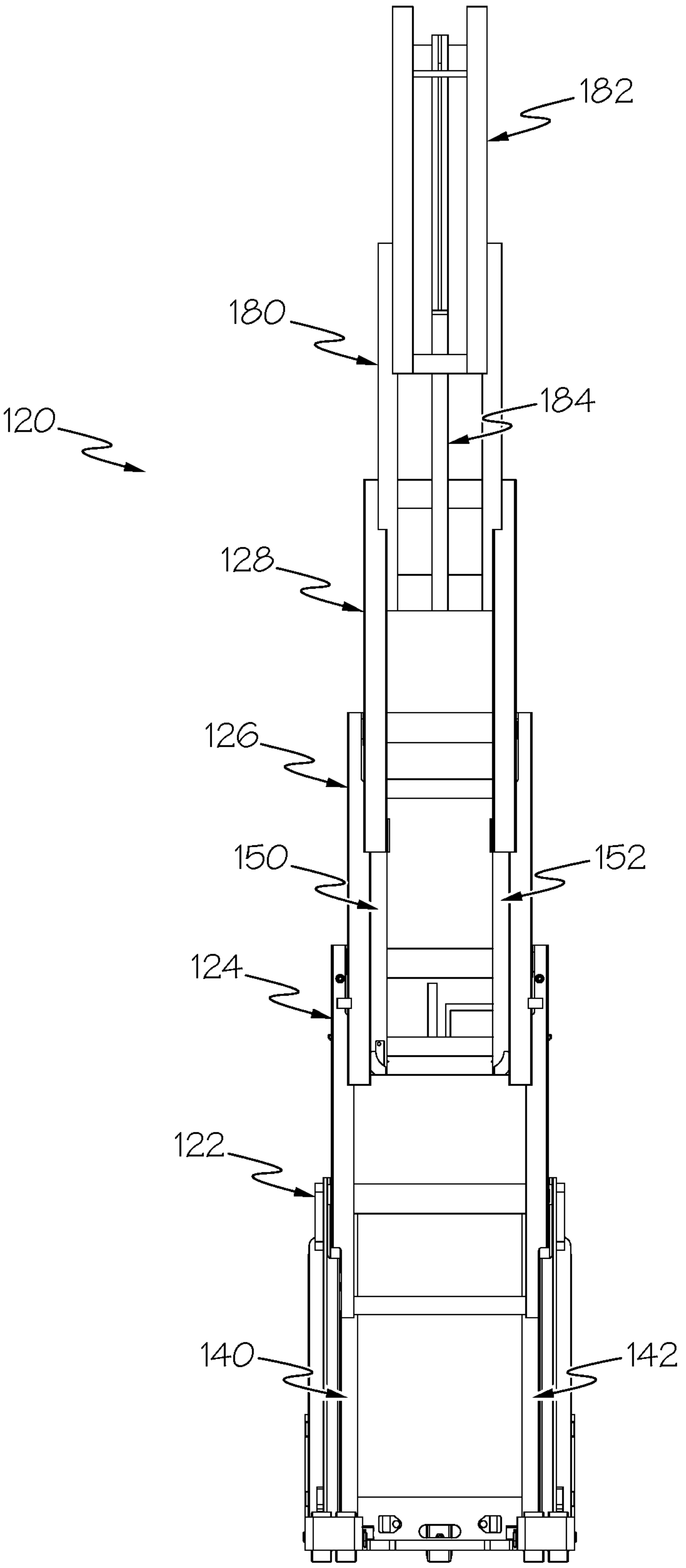
FIG. 9 is a rear to front elevation view of an alternative mast structure comprising a six stage mast assembly for the materials handling vehicle.

FIG. 9 illustrates an alternative mast structure comprising a six stage mast assembly 120, where elements corresponding to elements in FIGS. 1-3A are labeled with the same reference numerals increased by 100. The components of the first four stages of the six stage mast assembly 120 are the same as the stages described above for the four stage mast assembly 20. In particular, the mast assembly 120 includes a first weldment 122; a second weldment 124 actuated for vertical movement relative the first weldment 122 by first ram/cylinder assemblies 140, 142; a third weldment 126 actuated for vertical movement relative the second weldment 124 during actuation of the first ram/cylinder assemblies 140, 142 via a chain connection (not shown), as described above with reference to the mast assembly 20; a fourth weldment 128 actuated for vertical movement relative the third weldment 126 by second ram/cylinder assemblies 150, 152; a fifth weldment 180 actuated for vertical movement relative the fourth weldment 128 during actuation of the second ram/cylinder assemblies 150, 152 via a chain connection (not shown), as described above with reference to the mast assembly 20; and a sixth weldment 182 actuated for vertical movement relative to the fifth weldment 180 by a third ram/cylinder assembly 184. In addition, an operator compartment carriage (not shown) supporting an operator support structure (not shown) similar to the operator compartment carriage 33 and the operator support structure 32 described above for the vehicle 10 can be actuated for vertical movement relative the sixth weldment 182 via a chain connection (not shown), as described above with reference to the mast assembly 20.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A materials handling vehicle comprising:
a power unit supported on wheels;
a mast assembly supported on the power unit;
an operator compartment supported on the mast assembly for vertical movement, wherein the operator compartment comprises an operator platform; and
an operator console associated with the operator compartment comprising:
a transparent window providing an operator with a view of a floor surface when the operator compartment is in an elevated position, the transparent window being positioned above the operator platform; and
left-hand and right-hand control units for operation by the operator when the operator is positioned within the operator compartment, wherein the transparent window extends between the control units.

2. The materials handling vehicle as set out in claim 1, wherein the operator compartment further comprises:
a front wall, wherein the operator console is coupled to the front wall.

3. The materials handling vehicle as set out in claim 1, wherein the left-hand control unit comprises a steering control and the right-hand control unit comprises a traction control.

4. The materials handling vehicle as set out in claim 1, further comprising an auxiliary mast positioned on an opposite side of the operator compartment from the operator console.

5. The materials handling vehicle as set out in claim 4, further comprising a pair of forks extending outwards from a rear edge of the operator compartment and supported by the auxiliary mast.

6. The materials handling vehicle as set out in claim 4, wherein a control device is provided on the auxiliary mast.

7. The materials handling vehicle as set out in claim 1, wherein the transparent window provides the operator with a downward viewing angle up to 80 degrees relative to a horizontal plane.

8. The materials handling vehicle as set out in claim 1, wherein the operator console comprises a first control device and a second control device, and wherein at least a portion of the transparent window extends between the first and second control devices.

9. A materials handling vehicle comprising:
a power unit supported on wheels;
a mast assembly supported on the power unit;
an operator compartment supported on the mast assembly for vertical movement, wherein the operator compartment comprises an operator platform; and
an operator console associated with the operator compartment comprising:
a pair of substantially co-planar transparent panels providing an operator with a view of a floor surface when the operator compartment is in an elevated position, the transparent panels being positioned above the operator platform.

10. The materials handling vehicle as set out in claim 9, wherein the operator console further comprises left-hand and right-hand control units for operation by the operator when the operator is positioned within the operator platform.

11. The materials handling vehicle as set out in claim 10, wherein the left-hand control unit comprises a steering control and the right-hand control unit comprises a traction control.

12. The materials handling vehicle as set out in claim 10, wherein the operator compartment further comprises:
a front wall, wherein the operator console is coupled to the front wall.

13. The materials handling vehicle as set out in claim 10, wherein the left-hand control unit comprises a steering control and the right-hand control unit comprises a traction control.

14. The materials handling vehicle as set out in claim 9, further comprising an auxiliary mast positioned on an opposite side of the operator compartment from the operator console.

15. The materials handling vehicle as set out in claim 14, further comprising a pair of forks extending outwards from a rear edge of the operator compartment and supported by the auxiliary mast.

16. The materials handling vehicle as set out in claim 14, wherein a control unit is located on the auxiliary mast for operation by the operator when the operator is positioned within the operator platform facing in a rearward direction.

17. The materials handling vehicle as set out in claim 16, wherein a control device is provided on the operator console.

18. The materials handling vehicle as set out in claim 9, wherein the mast assembly comprises at least a four stage mast, wherein the four stage mast comprises at least four telescoping mast weldments.

* * * * *